(12) United States Patent
Srikantan et al.

(10) Patent No.: US 11,526,294 B2
(45) Date of Patent: *Dec. 13, 2022

(54) DISTRIBUTED STORAGE RESOURCE RESERVATION FOR REPLICATION, DISASTER RECOVERY AND DATA PROTECTION ACROSS MULTIPLE SITES

(71) Applicant: Cisco Technology, Inc., San Jose, CA (US)

(72) Inventors: Geetha Srikantan, Palo Alto, CA (US); Vishwas Srinivasan, Belmont, CA (US); Suman Saha, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/231,342

(22) Filed: Apr. 15, 2021

(65) Prior Publication Data

US 2021/0232320 A1      Jul. 29, 2021

Related U.S. Application Data

(63) Continuation of application No. 16/388,926, filed on Apr. 19, 2019, now Pat. No. 11,036,419.

(Continued)

(51) Int. Cl.
*G06F 12/00* (2006.01)
*G06F 3/06* (2006.01)
*G06F 9/455* (2018.01)

(52) U.S. Cl.
CPC .............. *G06F 3/065* (2013.01); *G06F 3/067* (2013.01); *G06F 3/0614* (2013.01);

(Continued)

(58) Field of Classification Search
None
See application file for complete search history.

(56) References Cited

U.S. PATENT DOCUMENTS 7,747,750 B1    6/2010 Simon et al.
9,448,927 B1    9/2016 Agarwala et al.
(Continued)

OTHER PUBLICATIONS

NetApp, Inc., "Cluster and SVM Peering Express Guide", 215-11182_G0, https://library.netapp.com/ecm/ecm_download_file/ECMLP2496233, Aug. 2018, 19 pages.

(Continued)

*Primary Examiner* — Daniel D Tsui
(74) *Attorney, Agent, or Firm* — Edell, Shapiro & Finnan, LLC

(57) ABSTRACT

A method includes: receiving, at a cluster controller of a first cluster, a request for pairing a first datastore of the first cluster to a second datastore of a second cluster, wherein each of the first cluster and the second cluster includes a plurality of datastores; determining whether the first datastore is available for pairing; in response to determining that the first datastore is available for pairing, generating an entry in a mapping table indicating that the first datastore is paired with the second datastore; receiving information associated with the second datastore; and in response to receiving the information, storing the information in the first datastore. The second cluster performs similar operations as those performed by the first cluster to achieve a bidirectional reservation between the first cluster and the second cluster.

20 Claims, 14 Drawing Sheets

Related U.S. Application Data

(60) Provisional application No. 62/696,926, filed on Jul. 12, 2018.

(52) U.S. Cl.
CPC ........ *G06F 3/0652* (2013.01); *G06F 9/45558* (2013.01); *G06F 2009/45562* (2013.01); *G06F 2009/45583* (2013.01); *G06F 2009/45595* (2013.01)

(56) References Cited

U.S. PATENT DOCUMENTS

| | | |
|---|---|---|
| 9,720,619 B1 | 8/2017 | Shah et al. |
| 10,229,021 B1 | 3/2019 | Iwamitsu et al. |
| 11,036,419 B1 * | 6/2021 | Srikantan ............ G06F 9/45558 |
| 2016/0140003 A1 | 5/2016 | Panara et al. |

OTHER PUBLICATIONS

NetApp, Inc., "Cluster peer intercluster networking requirements". Part No. 215-07956_A0, https://library.netapp.com/ecmdocs/ECMP1196798/html/GUID-9987850F-C3C7-4A71-B788-1F157ACD1B16.html, May 2013, 1 page.

NetApp, Inc., "Cluster and SVM peering workflow", ONTAP 9 Documentation Center, Part No. 215-11182_G0, http://docs.netapp.com/ontap-9/index.jsp?topic=%2Fcom.netapp.doc.exp-clus-peer%2FGUID-5954A646-EFA6-423C-BDAD-99E5B9EB28E5.html&cp=6_1_2, Aug. 2018, 2 pages.

* cited by examiner

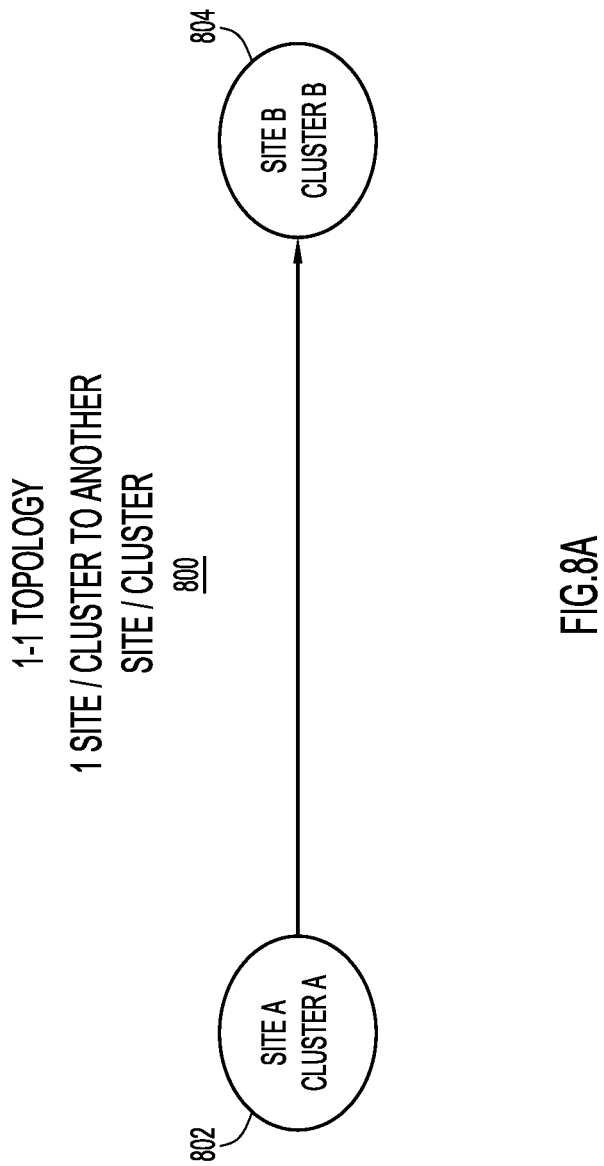

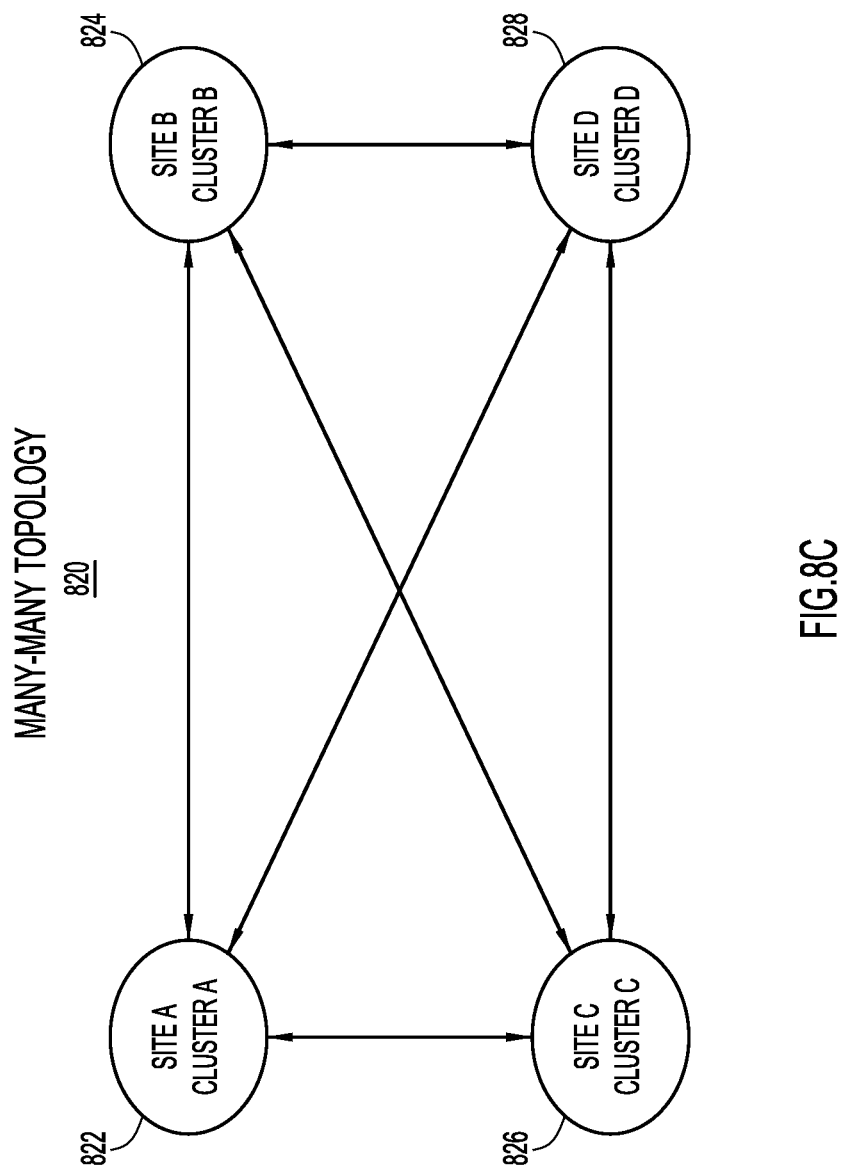

DISTRIBUTED STORAGE RESOURCE RESERVATION FOR REPLICATION, DISASTER RECOVERY AND DATA PROTECTION ACROSS MULTIPLE SITES

CROSS REFERENCE TO RELATED APPLICATIONS

This application is a continuation of U.S. patent application Ser. No. 16/388,926, filed Apr. 19, 2019, which in turn claims priority to U.S. Provisional Patent Application No. 62/696,926, filed Jul. 12, 2018. The entirety of each of these applications is incorporated herein by reference.

TECHNICAL FIELD

The present disclosure relates to distributed storage systems.

BACKGROUND

Business continuity and disaster recovery are important capabilities in network computation environments. Business continuity involves protection, replication, and recovery of virtual machines (VMs) across compute/storage clusters. In many instances, this replication communication traverses across the Internet, crossing datacenter boundaries. The VMs provide virtual resources for user data and applications.

Each of these compute/clusters is typically located within a datacenter at a site. The clusters and datacenters are logically distinct and very often are located within physically distinct datacenters. One common use case is to have geographically separate sites to improve protection. VMs on a cluster at Site A (or Cluster A) are protected on a cluster at Site B (Cluster B), and VMs on Cluster B are protected at Cluster A. Protection involves replication of VM data and metadata at frequent intervals, from Cluster A to Cluster B and from Cluster B to Cluster A. In the event of a disaster at, for example, Cluster A, the VMs which were at Cluster A can be recovered at Cluster B; likewise if there is a disaster at Cluster B, the protected VMs from Cluster B can be recovered at Cluster A, thereby providing Business Continuity for all applications that reside on the VMs.

BRIEF DESCRIPTION OF THE DRAWINGS

FIG. 8A illustrates a one-to-one cluster topology where the techniques for datastore reservation can be applied, according to an example embodiment.

FIG. 8C illustrates a many-to-many cluster topology where the techniques for datastore reservation can be applied, according to an example embodiment.

DESCRIPTION OF EXAMPLE EMBODIMENTS

Overview

Presented herein are techniques to manage distributed storage systems. A cluster controller of a first cluster receives a request for pairing a first datastore of the first cluster to a second datastore of a second cluster. Each of the first cluster and the second cluster includes a plurality of datastores. The cluster controller determines whether the first datastore is available for pairing. In response to determining that the first datastore is available for pairing, the cluster controller generates an entry in a mapping table indicating that the first datastore is paired with the second datastore. When the cluster controller receives information associated with the second datastore, it stores the information in the first datastore. The second cluster performs similar operations as those performed by the first cluster to achieve a bidirectional reservation between the first cluster and the second cluster.

The mechanism presented herein allows for direction-less storage resource reservations for direction-oriented protection, replication, recovery of VMs and datastores. The mechanism is agnostic to hypervisor operations, and agnostic to storage replication factors. The mechanism is extensible to a variety of topologies such as one-to-one (1-1), one-to-many (1-Many), many-to-one (Many-1), many-to-many (Many-Many) and reduces the proliferation of target datastores in Many-1 and 1-Many topologies. Reservations, once established, support all the disaster recovery functionalities without requiring further configuration or provisioning.

EXAMPLE EMBODIMENTS

Conventional solutions for managing datastores rely on auto-creation of datastores by explicit auto-pairing. In some case, the creation and reservation of one new datastore (volume) is to associate the datastore with each "disk" of each VM. Such approaches would cause a huge proliferation of datastores at the peer cluster, which in turn presents challenges in manageability and usability, problems which are further amplified in Many-1, 1-Many, and Many-Many environments. Techniques disclosed herein provide solutions to reduce the control/management overhead and improve storage space utilization.

The term "cluster" as used herein is meant to refer to a hyperconverged compute/storage cluster which is a cluster of compute/storage servers, each of which hosts a hypervisor.

Figure 1:
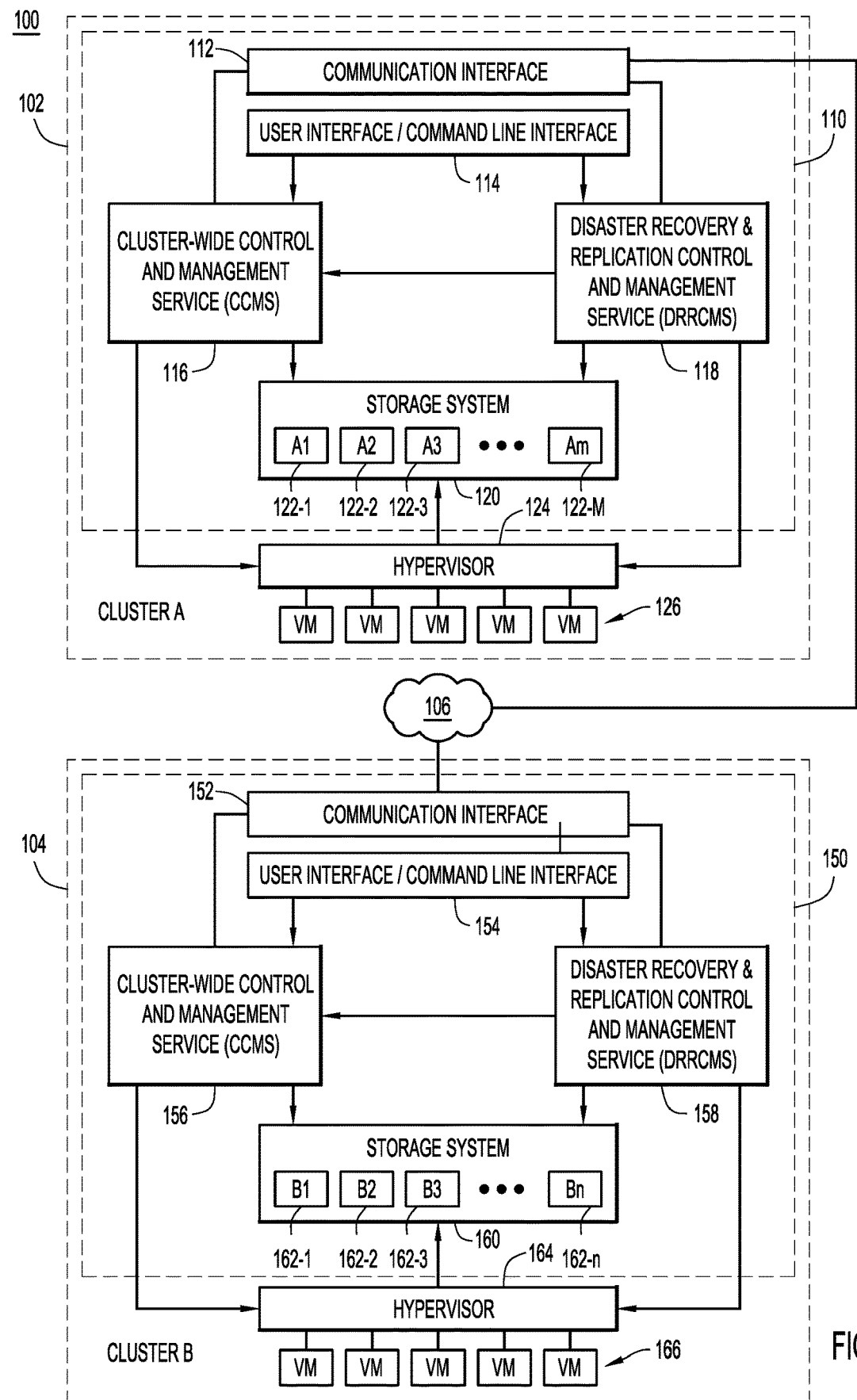
FIG. 1 is a block diagram of a system for business continuity and disaster recovery in which techniques for datastore reservation can be implemented, according to an example embodiment.

Techniques for managing datastore pairing will be explained with accompanying figures. Reference is first made to FIG. 1. FIG. 1 is a block diagram of a system 100 for business continuity and disaster recovery, according to an example embodiment. The system 100 includes at least two clusters, Cluster A (102) and Cluster B (104), connected to each other via a network 106. Each of Cluster A and Cluster B includes a plurality of physical computing and storage nodes, such as servers, storage devices (hard-drive disks, solid state memory modules, etc.), and other computer equipment. The network 106 could be an authenticated channel or the channel setup for inter-cluster communication. Moreover, Cluster A could be granted access to utilize resources at Cluster B for storage reservation and replication of VM data.

Cluster A includes a cluster controller 110 that includes a communication interface 112, a graphical user interface (or a command line interface) 114, a Cluster-wide Control and Management Service (CCMS) 116, a Disaster Recovery and Replication Control and Management Service (DRRCMS) 118 and storage system 120. The communication interface 112 is configured to transmit communications to, and receive communications from, network 106 for Cluster A. The user interface 114 is configured to allow a user/administrator to manage operations in Cluster A, such as creating a datastore, controlling settings such as a size of the datastore, renaming a datastore, and deleting a datastore.

The CCMS 116 is configured to control and manage cluster-wide operations in Cluster A. For example, the CCMS 116 provides mechanisms to manage and control the datastores for the Cluster A. A user/administrator may interact with the CCMS 116 via the user interface 114.

The DRRCMS 118 is configured to handle disaster recovery workflows including protection, replication, and recovery of virtual machines. In some embodiments, the DRRCMS 118 is configured to establish storage resource reservations, i.e. datastore reservations, for the functionalities DRRCMS 118 supports.

Cluster A further includes a storage system 120. The storage system 120 is a collection of storage resources in the Cluster A. For example, all or a portion of the storage nodes in the Cluster A may collectively form the storage system 120. The storage system 120 is logically partitioned to a plurality of datastores A1, A2, A3 . . . and Am (denoted 122-1, 122-2, 122-3 . . . and 122-m in FIG. 1, referred to collectively as datastores 122).

Cluster A further includes a hypervisor 124 that uses the storage system 120 to create and execute a plurality of virtual machines (VMs) 126. In some embodiments, the storage system 120 assigns a unique identifier to each datastore 122. The CCMS 116 provides mechanisms to associate the datastores 122 with the hypervisor 124, at which time each of the datastores 122 is assigned a hypervisor-specific identifier for hypervisor-specific operations such as provisioning storage for virtual machines 126. The CCMS 116 therefore provides interaction points for an administrator and the hypervisor 124.

Cluster B includes a cluster controller 150 that includes a communication interface 152, a graphical user interface (or a command line interface) 154, a CCMS 156, a DRRCMS 158 and a storage system 160. The communication interface 152 is configured to transmit communications to, and receive communications from, the network 106 for Cluster B. The user interface 154 is configured to allow a user/administrator to manage datastores of Cluster B, such as creating a datastore, controlling settings such as a size of the datastore, renaming a datastore, and deleting a datastore.

The CCMS 156 is configured to control and manage cluster-wide operations in Cluster B. For example, the CCMS 156 provides mechanisms to manage and control the datastores for the Cluster B. A user/administrator may interact with the CCMS 156 via the user interface 154.

The DRRCMS 158 is configured to handle disaster recovery workflows including protection, replication, and recovery of virtual machines. In some embodiments, the DRRCMS 158 is configured to establish storage resource reservations, i.e. datastore reservation, for the functionalities DRRCMS 158 supports.

The storage system 160 is a collection of storage resources in the Cluster B. For example, all or a portion of the storage nodes in the Cluster B may collectively form the storage system 160. The storage system 160 is logically partitioned into a plurality of datastores B1, B2, B3 . . . and Bn (denoted 162-1, 162-2, 162-3 . . . and 162-n in FIG. 1, collectively referred to as datastores 162).

Cluster B further includes a hypervisor 164 that uses the storage system 160 to create and run a plurality of VMs 166. The storage system 160 assigns a unique identifier to each datastore 162. The CCMS 156 provides mechanisms to associate the datastores 162 with the hypervisor 164, at which time each of the datastores 162 is assigned a hypervisor-specific identifier for hypervisor-specific operations.

In some embodiments, each of the Clusters A and B is a distributed cluster, including a storage system (120 or 160) and services to control and manage storage operations. The storage system (120 or 160) includes mechanisms to construct datastores, which are equivalent to physical volumes in converged/traditional storage. The storage system (120 or 160) has complete knowledge of the type of storage media, replication factor, and other properties that can be associated with the datastores (122 or 162).

A datastore reservation has many aspects:

1. The reservation is agnostic to upper-level workflows, such as cluster controller's operations to rename of the user visible virtualized datastore presented by the hypervisor, add or remove disks from the datastores to VMs, resize datastores, space usage of VMs, etc.

2. The reservation supports VMs spanning one or more datastores.

3. The reservation is agnostic to the variable Replication Factors (RF) used at a source cluster and a target cluster. For example, a source cluster RF could be 2, while a target cluster RF could be 3. Mapping and replication between the source cluster and the target cluster may be allowed by policies.

4. The reservation supports a Bidirectional Storage Resource Reservation, specifically the reservation should be agnostic to the direction of VM protection, replication and recovery in the general case. This also allows for specific use cases in making the reservation directional.

5. The reservation supports direction-specific workflows for protection, replication and recovery.

6. The reservation allows VM-level replication to be bundled into datastore-level replication, which is the opposite to what is allowed in other comparable technologies that provide datastore-level replication.

7. The datastore reservation mechanism supports integration with third party and legacy data protection frameworks, which rely on direction-oriented reservations.

8. The reservation mechanism should be extensible to various multi-site, multi-cluster topologies including 1-1, 1-Many, Many-1, and Many-Many.

9. The reservation supports the chaining of clusters for replication, such that VM-level replication from a first cluster to a second cluster and then datastore-level replication from the second cluster to a third cluster are allowed.

Techniques presented herein provide solutions for storage resource reservation for VM-level protection, replication and recovery, in a distributed cluster and distributed site environment, and having the features/functions listed above.

In some embodiments, VM replication can be chosen in either direction without re-doing an established distributed datastore reservation.

Techniques presented herein support different types of cluster pair/replication topologies such as 1-1, Many-1, 1-Many, and Many-Many. In some embodiments, the techniques treat each cluster pair as a 1-1 topology, and a distributed datastore reservation as 1-1 within the scope of that cluster pair. Many-1 and 1-Many combinations are supported as a composite of several 1-1 pairs. In some embodiments, the same datastore at Cluster A can participate in a distributed reservation between Clusters A and B, and in a reservation between Clusters A and C. The solutions presented herein allow re-use of a datastore in multiple independent reservations (distinguished by the cluster pair) thereby data from multiple volumes at distinct clusters can map to a single datastore at a target cluster, thereby saving on the number of datastores. In some embodiments, a datastore that has been reserved would not be used for another datastore reservation.

Disaster recovery operations and replication rely on reservation of storage resources between clusters. This reservation involves distributed transactions between two clusters and interactions between the CCMS (116 and 156) and DRRCMS (118 and 158) at each cluster.

In some embodiments, the CCMS (116 or 156) is the ultimate authority for controlling and managing a datastore at a cluster. Commands to remove or rename the datastore can be received at some time by the CCMS, and need to be processed appropriately. The CCMS provides mechanisms to provision datastores at the storage system (120 or 160). The storage system provides storage capacity, input/output access/usage and other services for the datastores. Provisioning of usage of datastore resources is performed in the hypervisor (124 or 164) environment.

For example, an administrator may use a user interface at a cluster to initiate datastore pairing. For the sake of describing embodiments, it is assumed that the administrator uses the user interface 114 of the Cluster A to make a request for pairing operations between the Cluster A and the Cluster B, although the administrator may use the user interface 154 at the cluster B as well.

As explained below, the DRRCMS maintains detailed pairing/mapping information about the pair (datastore "A1" of Cluster A and datastore "B1" of Cluster B) at both Clusters A and B. The CCMS records the reservation or pairing setting (without details of the peer cluster). The DRRCMS drives the workflow for reservation, and needs to ensure the CCMS is updated with the minimum information about the reservation.

The request is received by the DRRCMS 118 of the cluster controller 110. For example, the request is for pairing a first datastore (e.g., datastore A1) of the Cluster A to a second datastore (e.g., datastore B1) of the Cluster B. The DRRCMS 118 is configured to validate the request. For example, the DRRCMS 118 may determine if a prior pairing/reservation request is still pending for processing. If the prior request has not been complete, the DRRCMS 118 delays processing the current request. If the prior request has been resolved, the DRRCMS 118 may determine whether the datastore A1 is available for pairing. If the datastore A1 is available for pairing, the DRRCMS 118 is configured to make changes to the settings for the datastore A1 and to generate an entry in a mapping table at the DRRCMS 118, indicating that the datastore A1 is paired with the datastore B1. Later, the DRRCMS 118 may receive information associated with the datastore B1 of the Cluster B. In response thereto, the DRRCMS 118 is configured to look up the mapping table and store the information in the datastore A1.

In some embodiments, the DRRCMS 118 may further receive a validation notification from the DRRCMS 158 indicating that datastore B1 is available for pairing before generating an entry in the mapping table to indicate that the datastore A1 is paired with the datastore B1.

In some embodiments, the request may include one or more pairing operations between the Cluster A and the Cluster B. In processing a batch of pairing operations in a request, the DRRCMS 118 is configured to determine whether the pairing operations include a "delete" operation to delete a pairing entry in the mapping table and delete settings for a paired datastore so as to release the datastore from the pairing/reservation. If the pairing operations include one or more "delete" operations, the DRRCMS 118 is configured to process the "delete" operations prior to processing an "add" operation to add an entry to the mapping table. Processing "delete" operations could free/release datastores for an "add" operation to increase the success rate for pairing datastores. For example, the DRRCMS 118 can delete an entry in the mapping table before determining whether a datastore in the Cluster A is available for an "add" operation.

The DRRCMS 158 in the Cluster B performs similar operations as described above to make changes to the settings of the datastore B1 and generate an entry in a mapping table maintained by the DRRCMS 158, indicating the datastore B1 is paired with the datastore A1 of the Cluster A. Once both clusters successfully change the settings for datastores A1 and B1, and generate entries in their respective mapping table, the datastore reservation is complete for this pairing operation. The CCMS 116 of the Cluster A and the CCMS 156 of the Cluster B then disallow renaming or removing datastore A1 or datastore B1.

An example datastore reservation mechanism may include the following operations.

1. Interact with DRRCMS 118 at the Cluster A to validate and prepare to reserve datastore A1; update intent in the mapping table at DRRCMS 118 and reserve at CCMS 116 of Cluster A.

2. Interact with DRRCMS 158 at the Cluster B to validate and prepare to reserve datastore B1; update intent in the mapping table at DRRCMS 158 and reserve at CCMS 156 of Cluster B.

3. Establish the resource reservation for this bi-directional relation between datastore A1 of the Cluster A and datastore B1 of the Cluster B in a mapping table (Datastore Map);

4. Disallow administrative operations such as renaming or removing the datastores at Cluster A and at Cluster B while the reservation exists. This is because workflows relying on the reservation would be adversely impacted by the changes.

5. Make the reservation known to all usage/workflows such as protection, replication, and recovery including:
   Protection of VMs from Cluster A to Cluster B, or from Cluster B to Cluster A, or both.
   Replication of VMs from Cluster A to Cluster B, or from Cluster B to Cluster A, or both.
   Failover of VMs at Cluster A (from Cluster B), or at Cluster B (from Cluster A) as part of Recovery.
   Failback of Recovered VMs at Cluster A to Cluster B, or at Cluster B to Cluster A.
   Protection of VMs in reverse direction after failover.
   Migration of VMs from one cluster to another.
6. Support changes to reservation, if possible, while workflows continue to use other reservations.

In some embodiments, the DRRCMS 118 is configured to use paired datastores to protect VMs. For example, after the datastore A1 of the Cluster A and the datastore B1 of the Cluster B are paired, data associated with a virtual machine on the datastore B1 is replicated from datastore B1 of Cluster B to the datastore A1 of Cluster A, and vice versa. At some point, the DRRCMS 118 may receive a notification indicating that the datastore B1 at Cluster B is not functioning or that a virtual machine is not functioning at Cluster B. In response, the DRRCMS 118 is configured to instantiate a virtual machine in a node of the Cluster A using the information stored in the datastore A1, thereby restoring a function performed by the virtual machine previously operated at the Cluster B.

In some embodiments, the datastore B1 may later resume functioning. The DRRCMS 158 at the Cluster B is configured by an Administrator to send a notification to the DRRCMS 118 at the Cluster A, indicating that the datastore B1 has resumed functioning. In response, the DRRCMS 118 at the Cluster A is configured to replicate new data associated with a virtual machine at the datastore A1 to the Cluster B. Upon receiving the information, the DRRCMS 158 at the Cluster B stores the data associated with the virtual machine at the datastore B1, which is now functioning. The DRRCMS 158 at the Cluster B may then instantiate the virtual machine in a node of the Cluster B using the information stored in the datastore B1. The DRRCMS 158 may send a notification to the Cluster A indicating that the virtual machine is instantiated at the Cluster B. Based on a notification from an Administrator, the DRRCMS 118 may delete the virtual machine from the node in the Cluster A, thereby returning the function performed by the virtual machine to the Cluster B.

Figure 2:
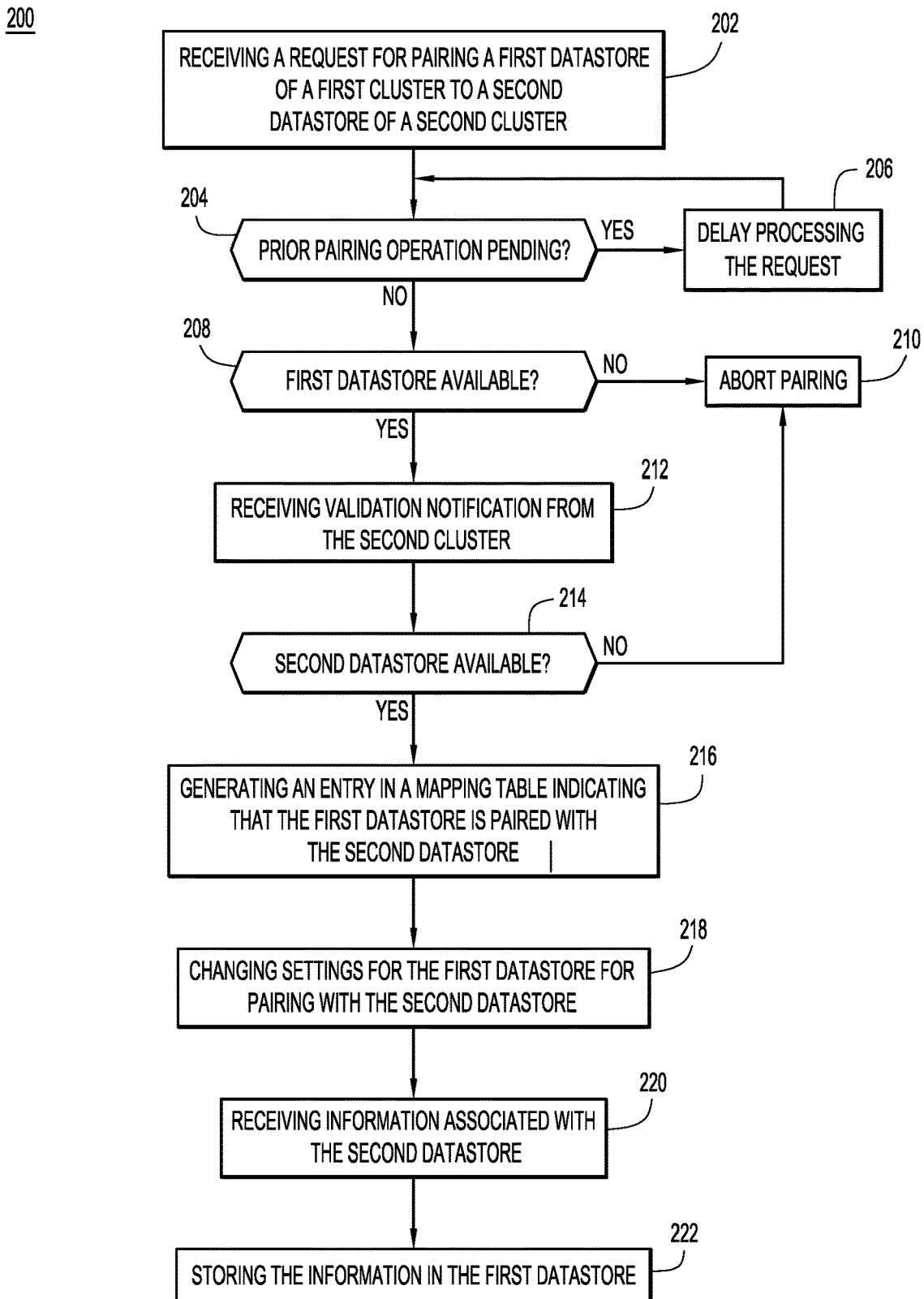
FIG. 2 is a flow chart illustrating a method for pairing datastores and replicating data at different clusters, according to an example embodiment.

Reference is made to FIG. 2. FIG. 2 is a flow chart illustrating a method 200 for pairing datastores and replicating data at different clusters, according to an example embodiment. The method 200 may be performed by the DRRCMS of a cluster controller of each cluster, such as by the DRRCMS 118 of Cluster A and DRRCMS 158 of Cluster B shown in FIG. 1. For simplicity, FIG. 2 is described form the perspective of the operations performed at a first cluster (e.g., Cluster A), but it is to be understood that these same operations are also performed at a second cluster (e.g., Cluster B). At 202, a cluster controller of a first cluster receives a request for pairing a first datastore of the first cluster to a second datastore of a second cluster. Each of the first cluster and the second cluster includes a plurality of datastores. At 204, the cluster controller determines whether a prior pairing operation (adding or deleting a pairing) is still pending for processing. If a prior pairing operation is still pending for processing in the first cluster (Yes at 204), at 206 the cluster controller delays processing the request until the prior pairing operation is complete. If there is no prior pairing operation pending for processing (No at 204), at 208 the cluster controller determines whether the first datastore is available for pairing. For example, the cluster controller may determine attributes of the first datastore, such as a size and remaining storage capacity of the first datastore, and compares them with the requested attributes such as a size and storage capacity of the second datastore. In some embodiments, the cluster controller may determine if the first datastore is properly functioning at the time. It is to be noted that one reason that a datastore may not be available for pairing is that it may already be in use for a different pairing between the same clusters.

If the first datastore is not available for pairing with the second datastore due to, for example, lack of sufficient storage capacity (No at 208), at 210 the cluster controller aborts the pairing operation. In some embodiments, the cluster controller may generate and display an error message in a user interface (e.g., user interface 112 in FIG. 1) for an administrator. In some embodiments, if the first datastore is available for pairing with the second datastore (Yes at 208), at 212 the cluster controller receives a validation notification from the second cluster indicating that the second datastore is available for pairing with the first datastore. For example, a cluster controller at the second cluster may perform operations similar to those at 204 and 208 to validate the pairing request.

Based on the notification, at 214 the cluster controller at the first cluster determines whether the second datastore is available for pairing with the first datastore. If the second datastore is not available (No at 214), the cluster controller aborts the pairing operation (210). If the notification indicates that the second datastore is available for pairing with the first datastore (Yes at 214), at 216 the paired entry is generated at the CCMS and a mapping table entry is generated at the DRRCMS indicating that the first datastore is paired with the second datastore. For example, the cluster controller may write unique identifiers for the first datastore and the second datastore together in the entry. In some embodiments, the entry may further include the sizes the first datastore and the second datastore and the storage space allocated for the pairing, and other relevant attributes of the first datastore and the second datastore. At 218, the cluster controller at the first cluster changes settings for the first datastore for pairing with the second datastore. Operation 218 completes the pairing operation/reservation for the first datastore and the second datastore. In some embodiments, the cluster controller may generate and display a success message in the user interface for the administrator. Thus, operation 218 performs a corresponding change on Cluster B. It is to be understood that as part of the method 200, the paired setting is updated at the CCMS and the mapping entry is updated at the DRRCMS for both clusters. Moreover, both clusters confirm the pairing for the reservation transaction to be declared completed as part of a final handshake.

After the pairing operation is successful, at 220 the cluster controller may receive information associated with the second datastore. For example, upon receiving a piece of information, the cluster controller may identify a unique identifier associated with the information and perform a look-up at the mapping table. If the cluster controller finds a hit (match) for the unique identifier associated with the second datastore in the mapping table, at 222 the cluster controller stores the information in the first datastore. The techniques improve the efficiency of protection and replication functions for the clusters as the cluster controller does not have to create a new datastore for every replication request from a peer cluster. The one-to-one mapping between the datastores in different clusters enables automatic replication of data/information in one datastore to another datastore in a different cluster.

Figure 3:
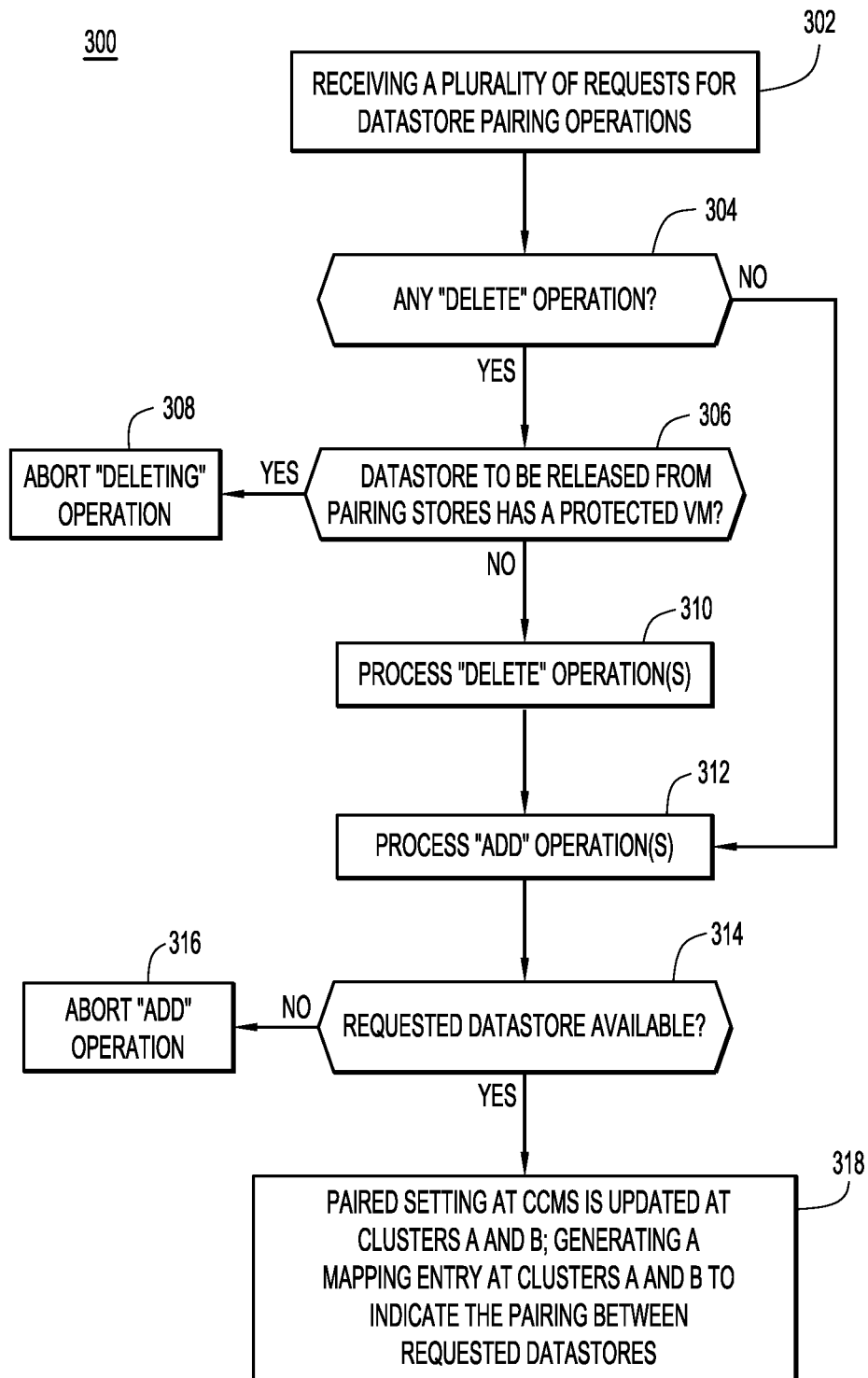
FIG. 3 is a flow chart illustrating a method for processing requests for datastore pairing operations, according to an example embodiment.

Reference is made to FIG. 3. FIG. 3 is a flow chart illustrating a method 300 for processing requests for datastore pairing operations, according to an example embodiment. The method 300 may be performed by a cluster controller of a cluster, such as the cluster controller 110 or 150 in FIG. 1. At 302, the cluster controller receives a request for one or more datastore pairing operations. For example, an administrator may use a user interface of the cluster to interact with the cluster controller to request pairing operations. At 304, the cluster controller determines whether the requested pairing operations include a "delete" operation to delete an entry in a mapping table that indicates a pairing of datastores of different clusters. The "delete" operation releases the datastores from pairing with each other.

If there is a "delete" operation in the request (Yes at 304), at 306 the cluster controller determines if the datastore to be released from the pairing stores has one or more protected VM(s). In some embodiments, a particular VM may be designated as protected by the administrator. For example, the particular VM may perform a core function for the cluster. When the datastore to be released from pairing stores a protected VM (Yes at 306), at 308 the cluster controller aborts the "delete" operation. In some embodiments, the cluster controller may then generate an error message for the administrator indicating the reason to abort. If the datastore to be released from pairing does not store a protected VM (No at 306), at 310 the cluster controller process the "delete" operation by removing the pairing entry from the mapping table, thereby releasing the datastores from pairing, which makes the datastores available for additional pairing operations.

If there is no "delete" operation in the request (No at 304) or after all "delete" operations have been completed, at 312 the cluster controller processes one or more "add" operation to add one or more pairing entries in the mapping table. At 314, the cluster controller determines whether the requested datastore is available for pairing. For example, the cluster controller may determine whether the requested datastore is properly functioning or has sufficient storage capacity for pairing with the other datastore. If the requested datastore is not available for pairing (No at 314), at 316, the cluster controller aborts the "add" operation and generates an error message indicating a reason for the error. If the requested datastore is available for pairing (Yes at 314), at 318, the cluster controller generates an entry in the mapping table at the DRRCMS indicating pairing of the requested datastore with the other datastore at both Clusters A and B.

Figure 4:
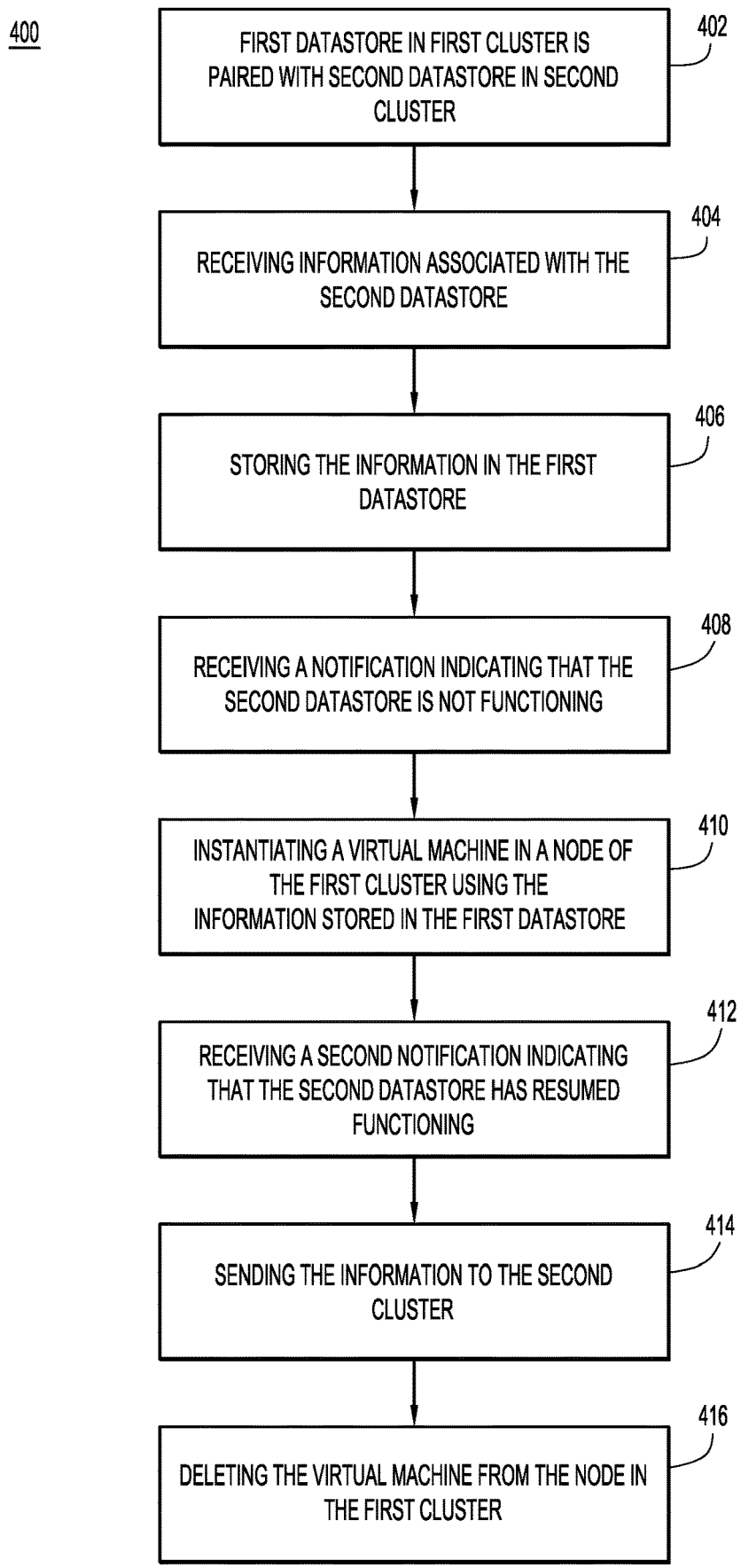
FIG. 4 is a flow chart illustrating a method for using paired datastores to protect, replicate, or recover data or virtual machines, according to an example embodiment.

Reference is made to FIG. 4. FIG. 4 is a flow chart illustrating a method 400 for using paired datastores to protect, replicate, or recover data or virtual machines, according to an example embodiment. The method 400 may be performed by a cluster controller of a cluster, such as the cluster controller 110 or 150 in FIG. 1. At 402, the cluster controller of a first cluster pairs a first datastore of the first cluster with a second datastore of a second cluster. At 404, the cluster controller receives information associated with the second datastore. In response, at 406 the cluster controller stores the information at the first datastore. This operation enables automatic data/information replication at both datastores.

In some embodiments, at 408 the cluster controller receives a first notification indicating that the second datastore is not functioning. For example, the second datastore may be relied upon for instantiating a virtual machine. When the second datastore is not functioning, the services provided by the virtual machine are interrupted. When this occurs, a second cluster controller at the second cluster may detect that the second datastore is not properly functioning and send the notification to the first cluster to initiate a failover operation. In response to receiving the notification, at 410 the cluster controller at the first cluster instantiates the virtual machine in a node of the first cluster using the information stored in the first datastore. This restores the services at the first cluster previously provided at the second cluster.

In some embodiments, at 412 the cluster controller receives a second notification indicating that the second datastore has resumed functioning. In response, at 414 the cluster controller sends the information stored at the first datastore to the second cluster. Based on a pairing entry maintained by the second cluster indicating that the second datastore is paired with the first datastore at the first cluster, the information can be stored at the second datastore. As such, the information is again replicated at both the first datastore and the second datastore. In some embodiments, after sending the information to the second cluster, at 416 the cluster controller may delete the virtual machine from the node in the first cluster. For example, upon a lapse of a time period or receiving a notification from the second cluster indicating that the virtual machine has been re-instantiated at the second cluster, the virtual machine at the first cluster can be deleted, as the services provided by the virtual machine is resumed at the second cluster.

Figure 5:
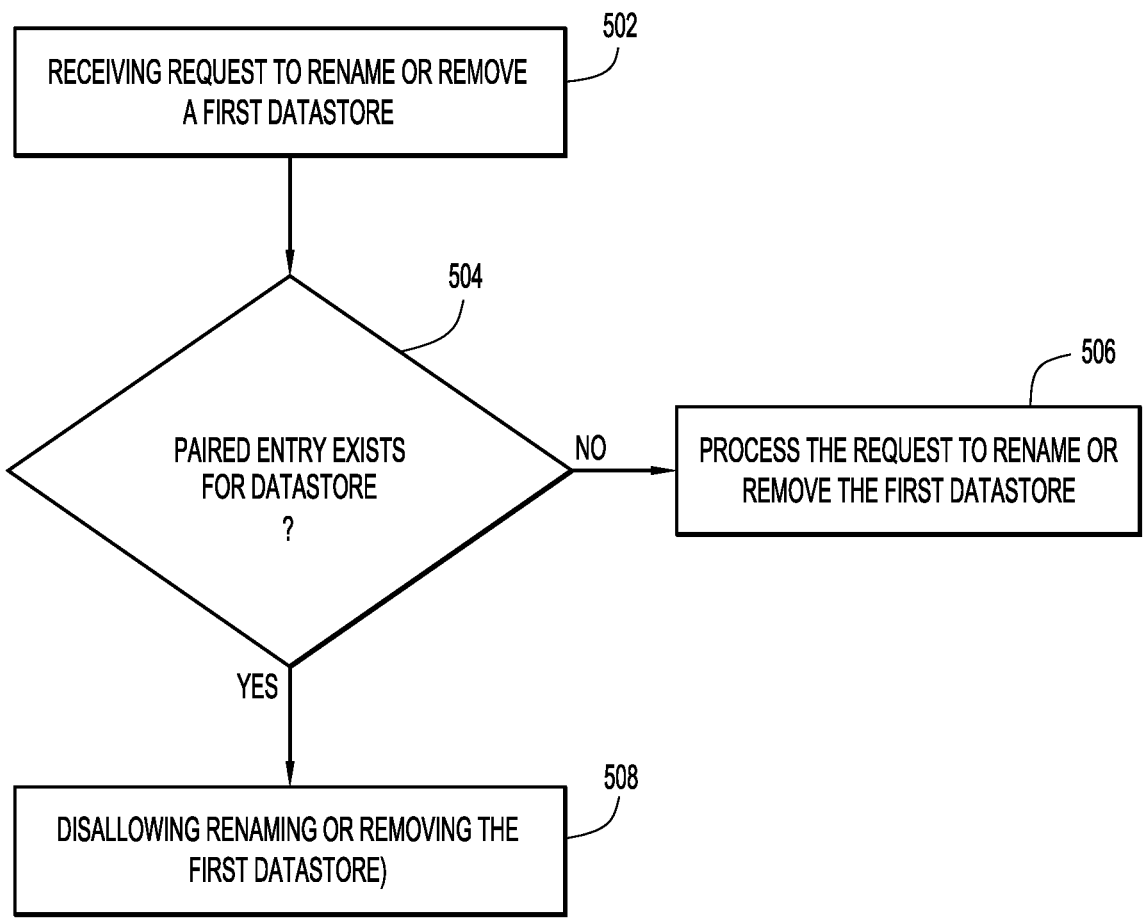
FIG. 5 is a flow chart illustrating a method for processing requests for renaming or removing datastores in clusters, according to an example embodiment.

Reference is made to FIG. 5. FIG. 5 is a flow chart illustrating a method 500 for processing requests for renaming or removing datastores in clusters, according to an example embodiment. For example, the method 500 may be performed by a cluster controller of a cluster, such as the cluster controller 110 or 150 in FIG. 1. At 502, the cluster controller receives a request to rename or remove a first datastore in the cluster. At 504, the cluster controller determines whether a pairing entry exists for the first datastore. If there is no pairing entry for the first datastore (No at 504), at 506 the cluster controller processes the request to rename or remove the first datastore. If there is a pairing entry for the first datastore (Yes at 504), at 508 the cluster controller disallows renaming or removing the first datastore. In some embodiments, the cluster controller may generate an error message for a user indicating the reason for disallowing the request. The method 500 ensures the integrity of the mapping table, which is for protection, replication, and recovery of data and/or virtual machines in the clusters. When a reservation transaction completes, there is a "paired" setting for the datastore A1 at the CCMS of Cluster A, a detailed mapping entry about datastore A1 and datastore B1 at the DRRCMS of Cluster A, a "paired" setting for the datastore B1 at the CCMS of Cluster B, and a detailed mapping entry about datastore B1 and datastore A1 at the DRRCMS of Cluster B.

Example Algorithm for Datastore Pairing/Mapping (Storage Reservation)

1. Datastore mapping is an asynchronous mechanism, and not an instantaneous one as fetching detailed datastore information at both clusters, validation and then the two-phase distributed transaction for making the storage reservation/mapping, can take a minute or more.

2. If the process or node where the Administrator's request to map datastores was running, crashes, the request is processed from where it was interrupted, at a different node, to bring the operation to completion.

3. Several pre-conditions are checked and validations are performed. For example, cluster-level pairing has to have been completed. If a previous datastore map (reservation) request is in progress, the datastore mapping workflow first allows the previous request to reach completion, before attempting a brand new mapping. The operations for validation of a new request is provided herein. In some embodiments, a request may contain, several pairs of the following form: <dsA1, dsB1, Op>, where dsA1 refers to a datastore at Cluster A, dsB1 refers to a datastore at Cluster B, and Op is the requested pairing operation including "add" or "delete" this pair from the mapping. The datastore mapping workflow further includes validating whether the request is well-formed, whether the datastores referenced in the request exist at both clusters, and whether there are some obvious inconsistencies in the request.

4. The datastore mapping workflow then computes changes to be made for pairing the datastores. For example, if a mapping table already has one or more mapping entries, the datastore mapping workflow first determines whether the request contains some pair(s) with a "delete" operation. If so, the datastore mapping workflow processes the "delete" operations before processing an "add" operation. If there are protected VMs associated with datastores that are included in the mapping table, that the pairing relationship cannot be removed from the mapping table. This validation process is performed on both clusters. After processing the "delete" operations to remove pairing entries, the datastore mapping workflow processes the "add" operations to add entries for datastore pairs. In some embodiments, in processing "add" operations, the datastore mapping workflow handles duplicates in the addition and detects 1-Many pairing request(s) and Many-1 pairing request(s). In some embodiments, the datastore mapping workflow may identify and subject the 1-Many or Many-1 pairing requests to additional treatments to fulfill the requests.

5. Example Workflow to Modify Datastore Mapping (Storage Reservation)

Assuming that an administrator makes a request to modify a datastore mapping at Cluster A, Cluster A (or simply A) is referenced as the initiator in the following descriptions.
  a. Mark intent to update mapping at the local cluster (initiator), and include the changes to be made. Persist this in the transaction log at the local cluster.
  b. Mark intent to update at the peer cluster, along with the details of the changes. Persist this in the transaction log at the peer cluster.
  c. Modify mapping/reservations on the peer cluster:
    i. Prepare the consolidated changes to be made to the datastore mapping (table), accounting for previously existing mapping, and the Administrator-requested changes.
    ii. Update CCMS for each datastore pair:
      1. For a "delete" operation, remove the paired settings for this datastore, in each datastore pair.
      2. For an "add" operation, add the paired settings for the peer cluster's datastore in each datastore pair.
    iii. Update DRRCMS
      1. Record completed mapping changes.
  d. Update workflow step state on local cluster.
    i. Update workflow state indicating that peer changes are completed.
  e. Modify mapping/reservations on the local cluster:
    i. Update workflow state, beginning changes locally.
    ii. Update CCMS.
      1. For a "delete" operation, remove the paired settings for this datastore, in each datastore pair.
      2. For an "add" operation, add the paired settings for the local cluster's datastore, in each datastore pair.
    iii. Update DRCM.
      1. Record completed mapping changes.
  f. Update local cluster—workflow state.
    i. Update workflow state that local cluster changes are completed.
  g. Update peer cluster.
    i. Workflow completed.
    ii. Mapping table ready for use.
  h. Update local cluster.
    i. Workflow completed.
    ii. Mapping table ready for use.

Any conflicts detected during operations 3, 4 and 5 above can be detected and handled without affecting ongoing replication or protection.

Figure 6:
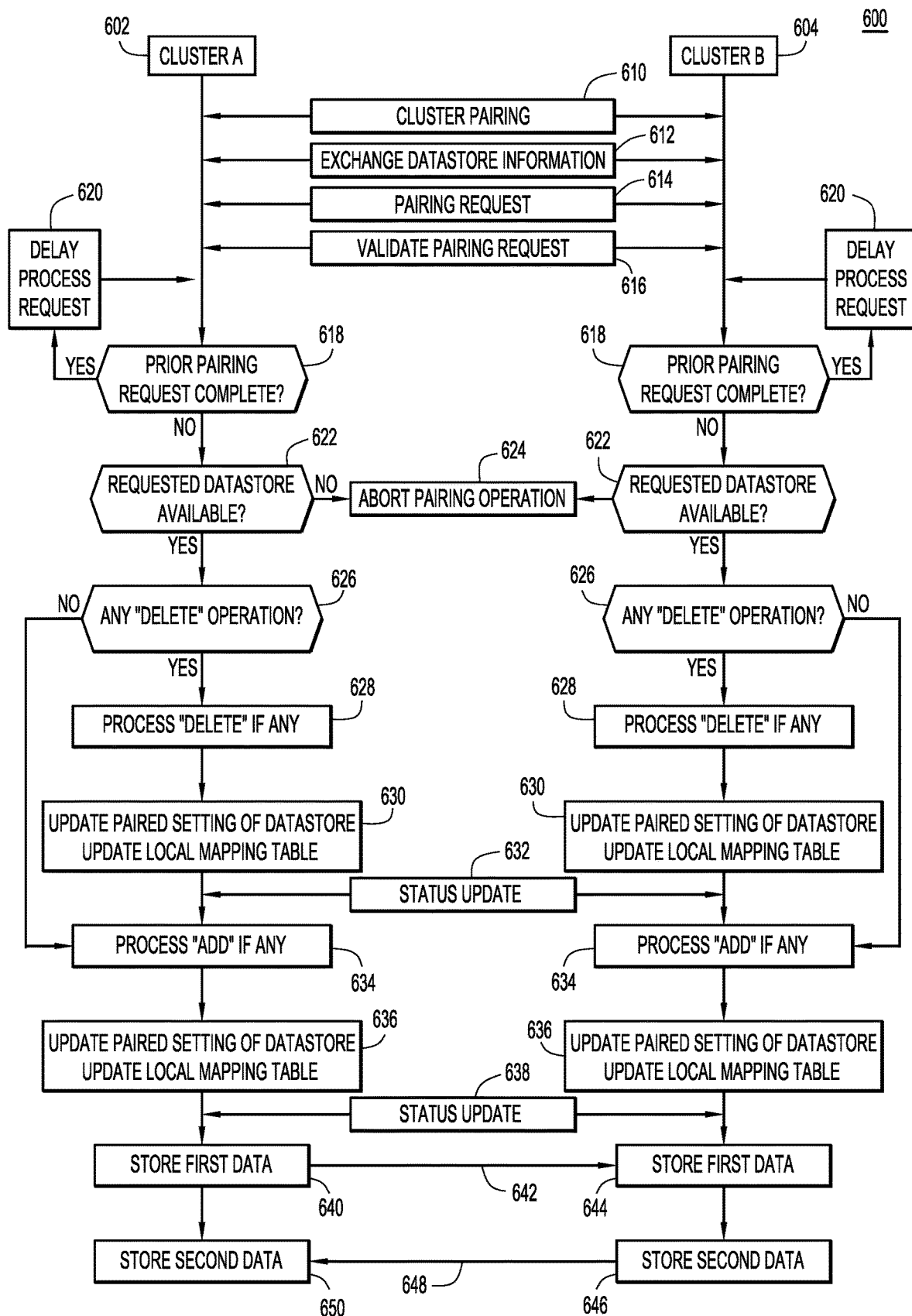
FIG. 6 is a flow chart showing a method for mapping/pairing/reserving datastores at different clusters, according to one example embodiment.

The above operations are further provided in FIG. 6. FIG. 6 is a flow chart showing a method 600 for mapping/pairing/reserving/replicating datastores at different clusters, according to one example embodiment. In FIG. 6, operations 610-620 relate to a mapping/pairing phase, operations 622-638 relate to a reservation phase, and operations 640-650 relate to a replication phase. The method 600 may be performed by cluster controllers of clusters, such as the cluster controllers 110 and 150 in FIG. 1. In the illustrated example, one or more datastores in Cluster A (602) are to be paired with one or more datastores in Cluster B (604). At 610, the Cluster A and the Cluster B perform cluster pairing. For example, each of the clusters may start a cluster pairing workflow to modify their firewall settings to establish a secured connection to communicate with each other. Once the cluster-level pairing is complete and the secured communication connection is established, at 612 the Cluster A and the Cluster B exchange their datastore information with each other via the secured communication connection. For example, the clusters may exchange datastore information such as a number of datastores, sizes of their datastores, utilization rate of the datastores, unique identifies for their datastores, etc.

At 614, one or both clusters receive a request for datastore pairing operations. In some embodiments, the pairing operations may include one or more "add" operations to add entries to a mapping table indicating pairing of datastores and/or one or more "delete" operations to delete pairing entries from the mapping table. Each of the clusters may include a cluster controller to generate and maintain the respective mapping table. In some embodiments, the mapping table may be provisioned to the respective clusters by an administrator. In the present embodiment, it is assumed that the request for datastore pairing operations is first received/initiated at the Cluster A (initiator), which then transmits the request to its peer cluster (Cluster B). For example, an administrator/user associated with the Cluster A may use a user interface to make the request at the Cluster A.

At 616, each of the clusters (through their respective cluster controllers) validates the pairing request. As part of the validation process, at 618 each of the clusters determines whether a prior pairing request is pending for processing in each cluster. For example, each of the clusters may engage in datastore pairing with other clusters (e.g., datastore pairing operations between Cluster A and Cluster C or between Cluster B and Cluster D) at the time they receive the new pairing request. If there is a prior datastore pairing request pending in Cluster A or Cluster B (Yes at 618), at 620, either cluster delays processing the request until the prior request(s) has been completed. This operation equals to a first-come first-serve scheme to process datastore pairing requests. In some embodiments, the clusters may allow a particularly designated request to override prior requests. That is, when receiving the designated request, the clusters may stop processing the prior pending requests and release datastores that have been paired based on the prior requests, and process the designated request.

If there is no prior datastore pairing request pending in Cluster A or Cluster B (No at 618), at 622 each of the clusters determines whether the requested datastores in the request are available for pairing. For example, the cluster controller in Cluster A determines whether the requested datastores match the datastores included in the Cluster A by checking the unique identifiers for the requested datastores or whether the requested datastores have sufficient storage capacity to be paired with peer datastores at the Cluster B. If either cluster determines that a requested datastore is not available for pairing operations (No at 622), at 624 the cluster aborts the pairing operation and generates a notification for the user or its peer cluster to indicate that the pairing operation cannot be complete. In some embodiments, the notification may include the reason for being unable to complete the pairing operation (e.g., "The requested datastore X does not exist.").

If the requested datastores are available for pairing operations (Yes at 622), at 626 each of the clusters determines whether a "delete" operation is included in the request. This operation ensures that a "delete" operation is executed before an "add" operation. If the request includes one or more "delete" operations, at 628 each of clusters 602 and 604 processes the "delete" operations. For example, the cluster controller at each cluster deletes settings for the pair of requested datastores that allow the datastores to perform data protection, replication, and/or recovery. The cluster controller at each cluster may further identify the pair of datastores in its local mapping table. At 630, the cluster controller in both clusters updates the paired setting of the datastore corresponding to the pair of datastores indicated by the "delete" operation to release the pair of datastore for future pairing operations. At 632, the clusters update each other with the status of their datastores. For example, the Cluster A can inform the Cluster B that a datastore has been released from a prior pairing and may be available for future pairing operations, and vice versa. Thus, as part of the "delete" operations, the paired setting is removed at the CCMS and the mapping entry is removed at DRRCMS, when the reservation is removed, at both Cluster A and Cluster B.

If the request includes no "delete" operation (No at 626) or the "delete" operations have been completed, at 634 the cluster controller at each cluster processes the "add" operations in the request. For example, the cluster controllers at the clusters 602 and 604 configure the pair of requested datastores for pairing with settings that allow the datastores to perform data protection, replication, and/or recovery. After the requested datastores have been configured for pairing, at 636 the cluster controller at both clusters updates the paired setting of the datastore by adding an entry in the mapping table corresponding to the pair of datastores indicated by the "add" operation. At 638, the clusters update each other with the status of their datastores. For example, the Cluster A can inform the Cluster B that the datastores are paired with each other and ready for data replication or recovery. A final handshake is made in this reservation transaction to mark completion of the changes.

Operations 640-650 relate to the replication phase, and depict how replication of VM data occurs between the clusters/datastores after a reservation has completed. At 640, the Cluster A stores first data in a first datastore that is included in an entry of its mapping table. Based on the settings of the datastore, at 642 the Cluster A automatically sends the first data to the Cluster B. At 644 the first data is then stored in a corresponding second datastore at the Cluster B, thereby enabling data replication from the first datastore at the Cluster A to the second datastore at the Cluster B.

At 646, the Cluster B stores a second data in the second datastore. Based on the settings of the datastore, at 648 the Cluster B automatically sends the second data to the Cluster A. At 650 the second data is then stored in the first datastore at the Cluster A, thereby enabling data replication from the second datastore at the Cluster B to the first datastore at the Cluster A.

The embodiments presented herein include the capability to query a local cluster (e.g., Cluster A) and a peer cluster (e.g., Cluster B) for their datastores, so that an Administrator may examine all existing datastores and choose which datastores to map. Furthermore, this capability may be extended to provide a listing of all mapped datastores, at either cluster.

Figure 7A:
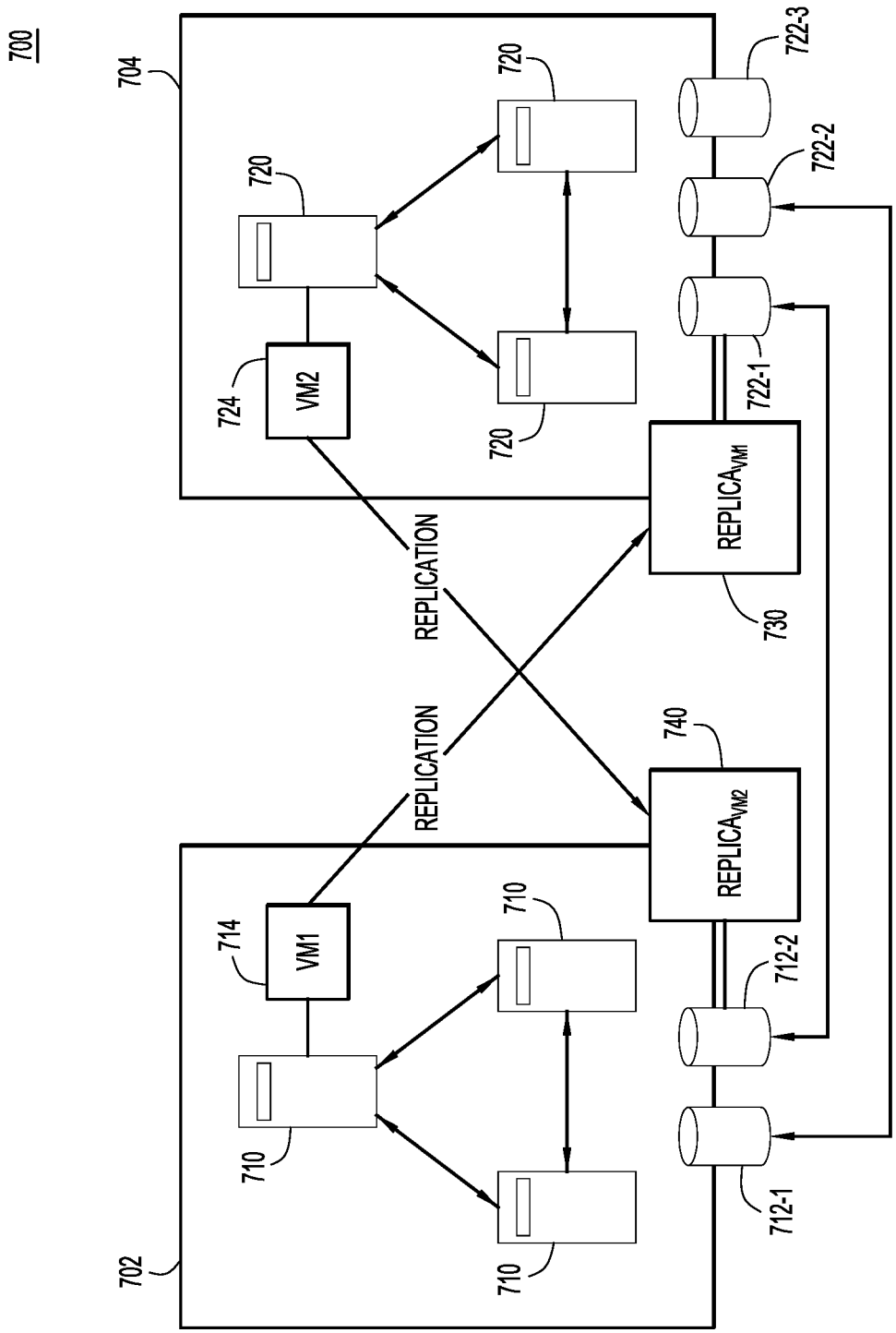
FIG. 7A illustrates a cluster system that includes a plurality of clusters located at different sites for data protection, replication, and recovery, according to an example embodiment.

Reference is made to FIG. 7A. FIG. 7A illustrates a cluster system 700 that includes a plurality of clusters located at different sites for data protection, replication, and recovery, according to an example embodiment. The system 700 includes a first cluster 702 and a second cluster 704. The first cluster 702 includes a plurality of nodes 710 (three nodes shown in FIG. 7A) and a plurality of datastores 712 (two datastores 712-1 and 712-2 shown in FIG. 7A). The first cluster 702 operates a virtual machine 714 (denoted VM1) at one of its nodes 710. The second cluster 704 includes a plurality of nodes 720 (three nodes shown in FIG. 7A) and a plurality of datastores 722 (three datastores 722-1, 722-2, and 722-3 shown in FIG. 7A). The second cluster 704 operates a virtual machine 724 (denoted VM2) at one of its nodes 720. The clusters 702 and 704 are paired at the cluster level and the datastore level using the techniques disclosed above. For example, datastores 712-1 of the first cluster 702 is mapped to datastore 722-2 of the second cluster 704, and datastore 712-2 of cluster 702 is mapped to datastore 722-1 of the second datastore. In some embodiments, data stored at the datastores 712-1 and 712-2 at the first cluster 702 is automatically replicated at the datastores 722-1 and 722-2 at the second cluster 704, and vice versa. The techniques disclosed herein thus enables bidirectional replication.

In some embodiments, the storage system also supports unidirectional replication. For example, when a virtual machine is operated in one of the clusters, a replica of the virtual machine may be automatically stored in a datastore of the peer cluster. As shown in FIG. 7A, a replica 730 of the virtual machine VM1 that is operated in the first cluster 702 is automatically stored in the second cluster 704, e.g., at the datastore 722-1, and a replica 740 of the virtual machine VM2 that is operated in the second cluster 704 is automatically stored in the first cluster 702, e.g., at the datastore 712-2. In some embodiments, a virtual machine in the storage system 700 may be protected by storing information that is needed to instantiate the virtual machine at a node of a peer cluster. For example, in addition to or instead of storing a replica of VM1 in the datastore 722-1, information that is needed to instantiate VM1 is stored in the datastore 722-1 (or other datastores in the second cluster 704).

Figure 7B:
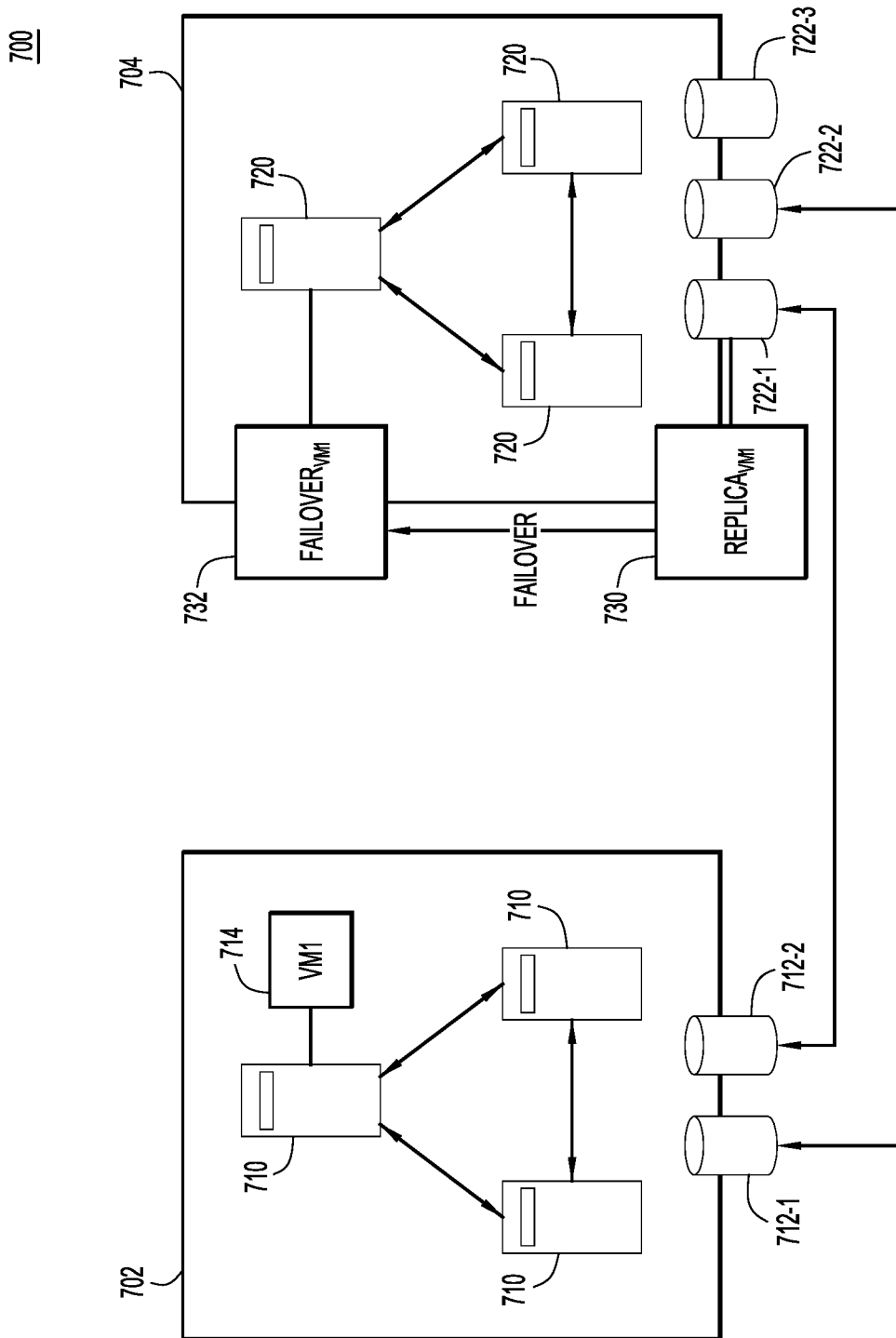
FIG. 7B illustrates the cluster system shown in FIG. 7A that provides a failover mechanism for a failed virtual machine, according to an example embodiment.

The storage system 700 is further configured to support a failover mechanism. An example of a failover mechanism is shown in FIG. 7B. The first cluster 702 detects that virtual machine VM1 is not functioning and informs the second cluster 704 of the failure. The second cluster 704 then uses the replica 730 of the VM1 stored in the datastore 722-1 and instantiates a failover virtual machine 732 at one of the nodes 720 of the second cluster 704, thereby restoring the function at the second cluster 704 that was previously provided by VM1 of the first cluster 702.

Figure 7C:
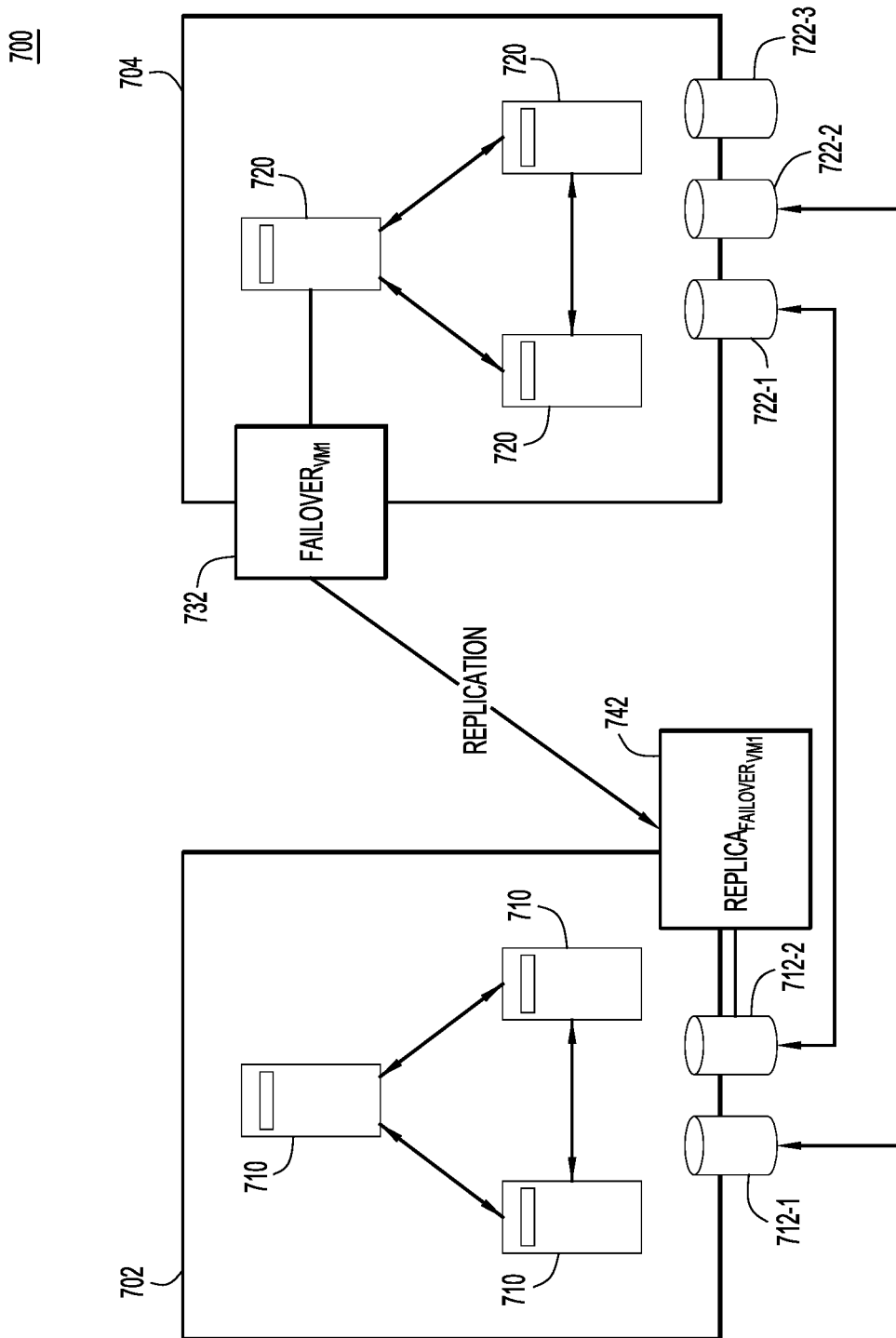
FIG. 7C illustrates the cluster system shown in FIG. 7A that provides a failback mechanism for a failed virtual machine, according to an example embodiment.

The storage system 700 is further configured to support a failback mechanism. An example of a failback mechanism is shown in FIG. 7C. As shown in FIG. 7C, after the failover virtual machine 732 is operated at the second cluster 704, a replica 742 of the failover virtual machine 732 is automatically stored at the first cluster 702, e.g., at the datastore 712-2. Because the failover virtual machine 732 is a replica of VM1, the replica 742 of the failover virtual machine 732 is also a replica of VM1. As such, a replica of VM1 is again stored in the first cluster 702 where the original VM1 was operated.

Figure 7D:
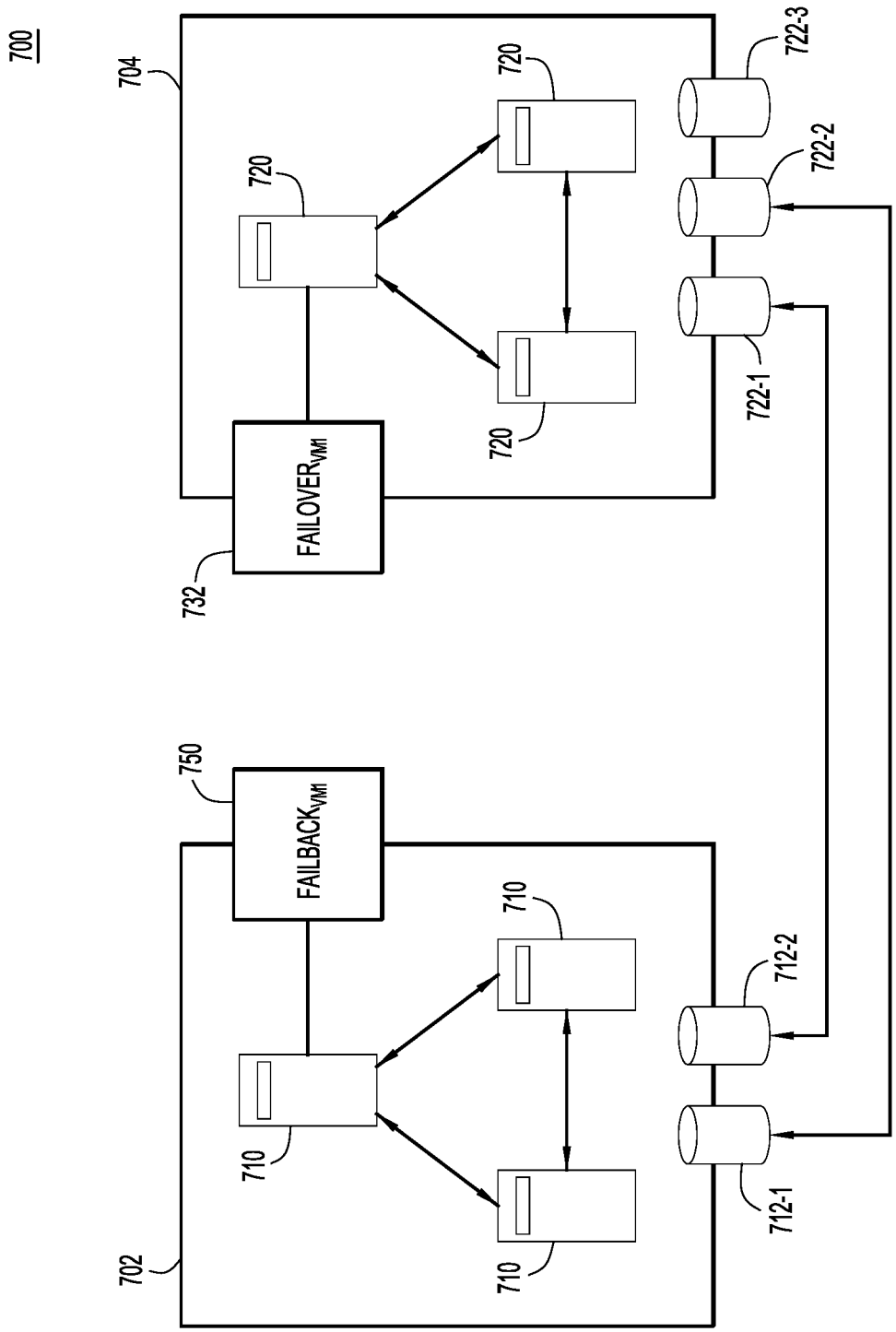
FIG. 7D illustrates the cluster system shown in FIG. 7A that provides another failback mechanism for a failed virtual machine, according to an example embodiment.

Reference is made to FIG. 7D, after the replica 742 of the failover virtual machine 732 is automatically stored at the first cluster 702, the first cluster 702 can instantiate a failback virtual machine 750 based on the replica 742, thereby restoring the function at the first cluster 702 that was previously provided by VM1. In some embodiments, after failback virtual machine 750 is instantiated at the first cluster 702, the second cluster 704 is configured to delete the failover virtual machine 732 to conserve resources.

These techniques enable protection, replication, and recovery of virtual machines and data of the clusters in the event of a disaster at one of the clusters. The techniques also reduce manual intervention in managing the clusters when a disaster occurs in one of the clusters.

The advantages of the techniques presented herein are manifold. Storage reservation is achieved in a distributed environment across geographically separated sites. The reservation can be direction-less and supports usage for direction-oriented workflows. These direction-oriented workflows can be from a Cluster A to a Cluster B or from the Cluster B to the Cluster A. VM level replication, which is direction-oriented, is supported by the reservation techniques. Location and direction-oriented workflows in recovery—failover and failback—are supported by the reservation techniques. VM level replication can be bundled as datastore level replication. This solution enables integration with third party legacy, volume-based replication and recovery, where such third party mechanisms are direction-oriented. Storage reservation is a distinct one-to-one map of a single datastore from a Cluster A to a single datastore at a Cluster B, and is within scope of cluster pair. Each datastore at the Cluster A can be mapped to at most one datastore at the Cluster B, and vice versa. The techniques can be applied to multi-cluster topologies such as 1-Many, Many-1, Many-Many, treating these topologies as many one-to-one (1-1) cluster pairs.

For example, FIG. 8A illustrates a one-to-one cluster topology 800 where the techniques for datastore reservation can be applied, according to an example embodiment. As shown in FIG. 8A, a Cluster A (802) at a site A is paired with a Cluster B (804) at a site B at the cluster level. The techniques disclosed herein can be applied to the clusters to pair datastores of the Cluster A with datastores of the Cluster B.

Figure 8B:
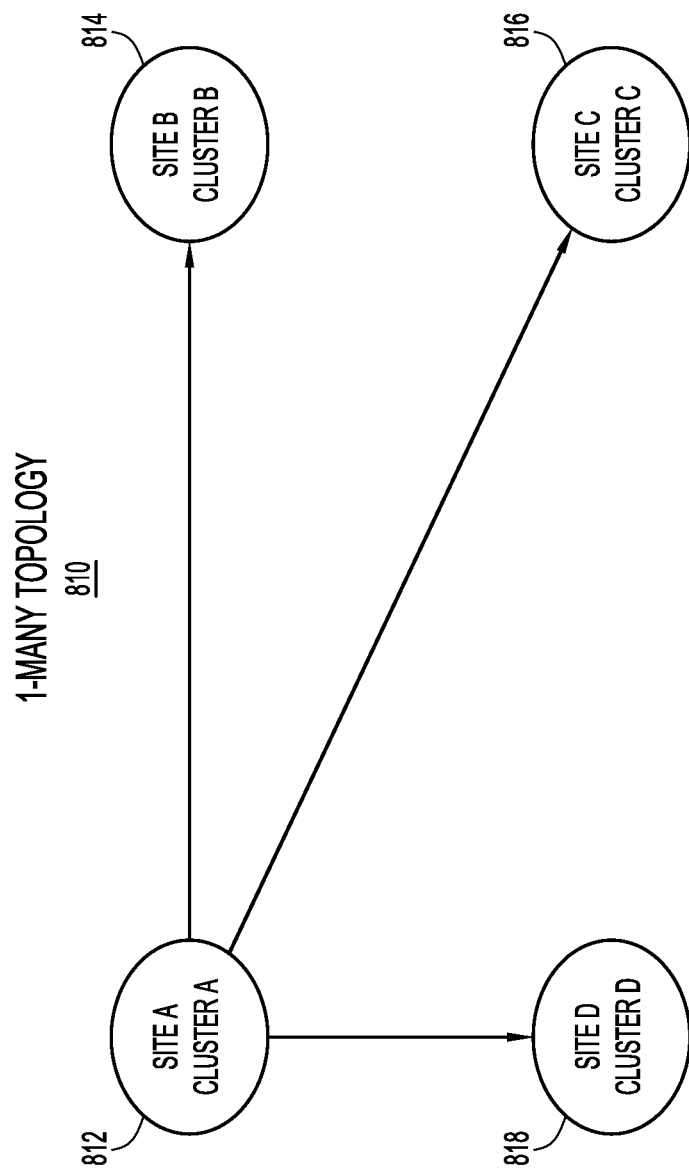
FIG. 8B illustrates a one-to-many cluster topology where the techniques for datastore reservation can be applied, according to an example embodiment.

FIG. 8B illustrates a one-to-many cluster topology 810 where the techniques for datastore reservation can be applied, according to an example embodiment. In the topology 810, a cluster A (812) at a site A is paired with three clusters: a Cluster B (814) at a site B, a Cluster C (816) at a site C, and a Cluster D (818) at a site D, at the cluster level. Datastore pairing can be performed sequentially between Cluster A and Cluster B, between Cluster A and Cluster C, and between Cluster A and Cluster D. It is to be understood that the sequence is not so limited. The techniques disclosed herein allow three one-to-one datastore-level pairings to be performed between the clusters to achieve datastore pairing in this topology.

FIG. 8C illustrates a many-to-many cluster topology 820 where the techniques for datastore reservation can be applied, according to an example embodiment. The topology 820 includes four clusters: a cluster A (822) at a site A, a Cluster B (824) at a site B, a Cluster C (826) at a site C, and a Cluster D (828) at a site D. Each of the clusters is paired with all other clusters at the cluster level. The techniques disclosed herein allow one-to-one datastore-level pairings among the clusters. For example, a first set of datastores of the Cluster A is paired with a first set of datastores of the Cluster B; a second set of datastores of the Cluster A is paired with a first set of datastores of the Cluster C; a third set of datastores of the Cluster A is paired with a first set of datastores of the Cluster D; a second set of datastores of the Cluster B is paired with a second set of datastores of the Cluster C; a third set of datastores of the Cluster B is paired with a second set of datastores of the Cluster D; and a third set of datastores of the Cluster C is paired with a third set of datastores of the Cluster D.

Datastore reservation according to the techniques disclosed herein may be one-to-one at the datastore level in that each datastore at a primary cluster participates in at most one reservation with one datastore at a secondary cluster, and vice versa.

The techniques disclosed herein also provide mechanisms for handling errors occurred during the various operations described above. For example, the processes performed by CCMS or DRRCMS could be interrupted at the local cluster or at the peer cluster. When this occurs, the techniques can provide mechanisms to restart the processes. For example, the transactions by the CCMS and DRRCMS can be resumed, either by an administrator or programmatically via an asynchronous job handling infrastructure. In some embodiments, the cluster controller that executes the CCMS or DRRCMS may have an outage, at either the local cluster or at the peer cluster. When this occurs, an asynchronous job handling infrastructure or an administrator may select a different controller virtual machine to replace the failed cluster controller and to continue executing the CCMS or DRRCMS for the operations described above.

In some embodiments, the local cluster or the peer cluster may experience a cluster-level outage. In case of a temporary cluster-level outage, the transactions by the CCMS and DRRCMS can be resumed, either by an administrator or programmatically via an asynchronous job handling infrastructure. In case of a permanent cluster-level outage, the two-cluster transactions (illustrated in FIG. 6) cannot proceed. The ongoing transaction is then rolled back at the surviving cluster by "forgetting" the ongoing workflow and rolling back changes made by the CCMS and DRRCMS.

In some embodiments, there may be errors that prevent the two-phase, two-cluster storage reservation transactions from rolling forward to completion. For example, an administrator may have entered parameters for a transaction and also made a conflicting change to the datastores at either cluster. When this occurs, the transaction at both the clusters may be rolled back by "forgetting" the ongoing transaction and the clusters roll back changes made by the CCMS and DRRCMS to both clusters.

Figure 9:
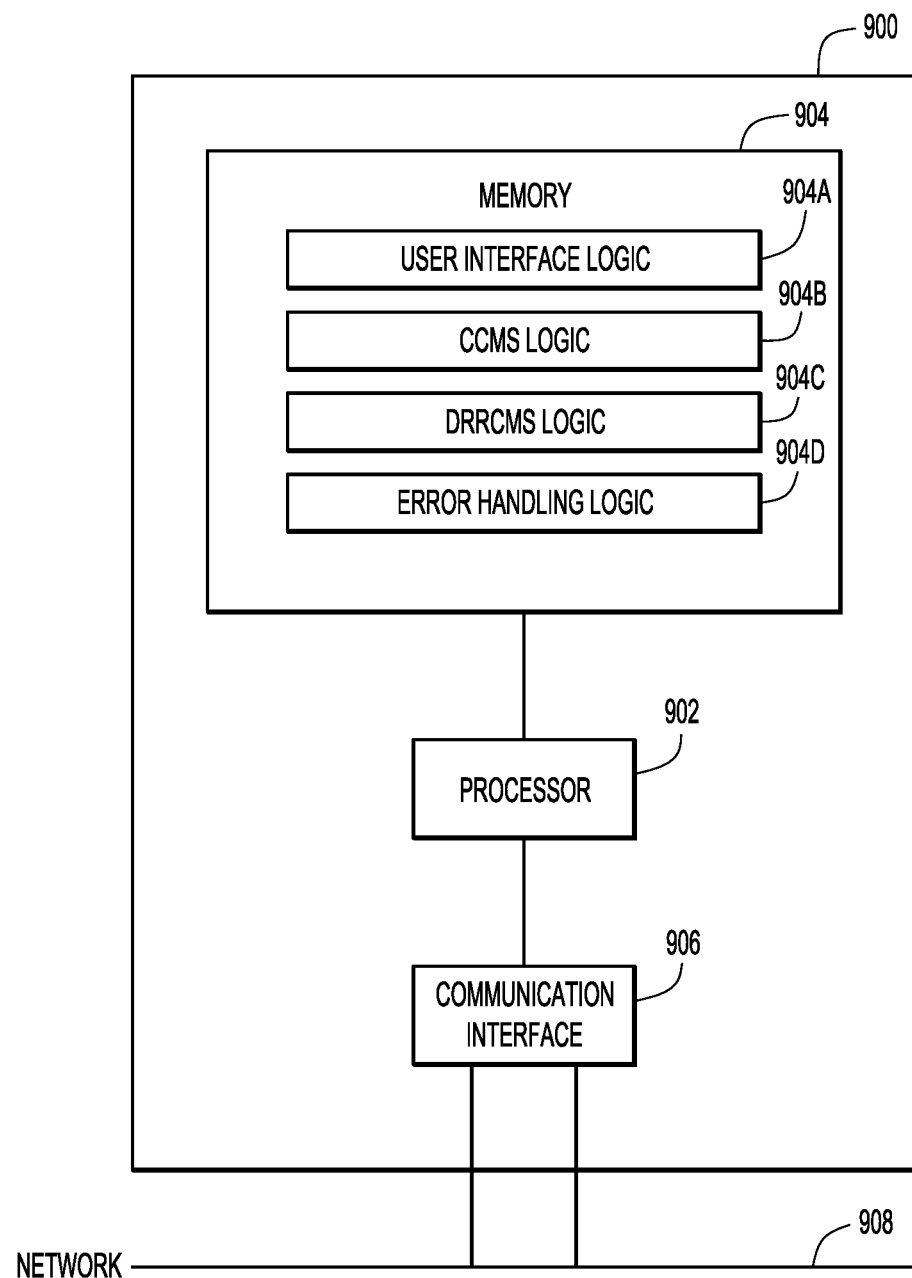
FIG. 9 is a block diagram of a server configured to participate in the techniques presented herein, according to an example embodiment.

FIG. 9 depicts a block diagram of a server 900 to participate in the mechanisms disclosed herein, according to an example embodiment. The server 900 can perform the functions of a cluster controller as described above. The server 900 includes a processor 902, a memory 904, and a communication interface 906. The processor 902 may be a microprocessor or microcontroller (or multiple instances of such components) that is configured to execute program logic instructions (i.e., software) for carrying out various operations and tasks described herein. For example, the processor 902 is configured to execute instructions stored in the memory 904 for performing datastore reservation/pairing/mapping operations as explained above.

The memory 904 may include read-only memory (ROM), random access memory (RAM), magnetic disk storage media devices, optical storage media devices, flash memory devices, electrical, optical or other physical/tangible memory storage devices. The memory 904 stores a user interface logic 904A, a CCMS logic 904B, a DRRCMS logic 904C, an error handling logic 904D, etc.

The functions of the processor 902 may be implemented by logic encoded in one or more tangible (non-transitory) computer-readable storage media (e.g., embedded logic such as an application specific integrated circuit, digital signal processor instructions, software that is executed by a processor, etc.), wherein the memory 904 stores data used for the operations described herein and stores software or processor executable instructions that are executed to carry out the operations described herein.

In some embodiments, the processor 902 may be embodied by digital logic gates in a fixed or programmable digital logic integrated circuit, which digital logic gates are configured to perform the user interface logic 904A, the CCMS logic 904B, the DRRCMS logic 904C, and the error handling logic 904D. In general, the user interface logic 904A, the CCMS logic 904B, the DRRCMS logic 904C, and the error handling logic 904D may be embodied in one or more non-transitory computer-readable storage media encoded with software comprising computer executable instructions and when logics are executed operable to perform the operations described herein.

The communication interface 906 is configured to transmit communications to, and receive communications from, a network 908 for the server 900. In one example, the communication interface 906 may take the form of one or more network interface cards.

Storage datastore reservation between clusters allows for several workflows including:

1. Protection of VMs associated with the datastores to automatically use the reserved datastores on each cluster.
2. Replication of VM data and metadata between clusters.
3. Protection of groups of VMs associated with the datastores to automatically use the reserved datastores on each cluster.
4. Protection of VMs associated with the datastores to automatically use the mapped (or reserved) datastores on each cluster.
5. Replication of groups of VMs, with metadata about the group, VMs and data for the VMs.
6. Migration of VMs residing on a primary site to a secondary site.
7. Protection of groups of VMs associated with the datastores to automatically use the mapped datastores on each cluster.
8. Failover of VMs at the secondary site when the primary site suffers outage.
9. Failback of VMs from the secondary site back to the primary site.
10. Reverse protection of VMs after failover.

A single datastore reservation operation can associate pairs of datastores, such that one member of the pair is from the primary cluster and the other member is from the secondary cluster. In some embodiments, the mapping is configured to be unique and one-to-one correspondence. Mappings can also be removed, as long as they are not in use. The mapping, once created, prevents the datastore from be removed and renamed, or other cluster-level changes to the mapped datastores, as these operations can impact other Disaster Recovery/Native Replication workflows.

For replication made to public cloud environments, the techniques disclosed herein help to reduce a number of distinct storage entities. When costs associated with cloud storage (remote storage) are based on number of storage devices used, the techniques disclosed herein allows cost savings as a potentially large number of volumes are mapped to a small set of volumes in the cloud (remote storage site).

In summary, a method is provided comprising: receiving, at a cluster controller of a first cluster, a request for pairing a first datastore of the first cluster to a second datastore of a second cluster, wherein each of the first cluster and the second cluster includes a plurality of datastores; determining whether the first datastore is available for pairing; in response to determining that the first datastore is available for pairing, generating an entry in a mapping table indicating that the first datastore is paired with the second datastore; receiving information associated with the second datastore; and in response to receiving the information, storing the information in the first datastore.

In another form, an apparatus is provided comprising: a communication interface that enables network communications; a processor; and a memory storing data and instructions executable by the processor, wherein the processor is configured to execute the instructions to: receive, at a cluster controller of a first cluster, a request for pairing a first datastore of the first cluster to a second datastore of a second cluster, wherein each of the first cluster and the second cluster includes a plurality of datastores; determine whether the first datastore is available for pairing; in response to determining that the first datastore is available for pairing, generate an entry in a mapping table indicating that the first datastore is paired with the second datastore; receive information associated with the second datastore; and in response to receiving the information, store the information in the first datastore.

Further still, one or more non-transitory computer-readable storage media are provided, encoded with software comprising computer executable instructions which, when executed by a processor of a cluster controller of a first cluster, cause the processor to: receive a request for pairing a first datastore of the first cluster to a second datastore of a second cluster, wherein each of the first cluster and the second cluster includes a plurality of datastores; determine whether the first datastore is available for pairing; in response to determining that the first datastore is available for pairing, generate an entry in a mapping table indicating that the first datastore is paired with the second datastore; receive information associated with the second datastore; and in response to receiving the information, store the information in the first datastore.

The above description is intended by way of example only. The present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Although the techniques are illustrated and described herein as embodied in one or more specific examples, it is nevertheless not intended to be limited to the details shown, since various modifications and structural changes may be made within the scope and range of equivalents of this disclosure.

What is claimed is:

1. A method comprising:
receiving, at a cluster controller of a first cluster, a request for pairing a first datastore of the first cluster to a second datastore of a second cluster, wherein each of the first cluster and the second cluster includes a plurality of datastores;
determining whether the first datastore is available for pairing;
in response to determining that the first datastore is available for pairing, generating an entry in a mapping table indicating that the first datastore is paired with the second datastore;
receiving a notification indicating that the second datastore is not functioning; and
in response to receiving the notification, instantiating a virtual machine in a node of the first cluster using information stored in the first datastore.

2. The method of claim 1, wherein the entry is a first entry, the method further comprising:
receiving an operation request to perform a datastore-pairing operation on the first cluster;
determining whether the datastore-pairing operation is to add or delete a second entry in the mapping table; and
in response to determining that the datastore-pairing operation is to delete the second entry in the mapping table, deleting the second entry in the mapping table before determining whether the first datastore is available for pairing.

3. The method of claim 1, further comprising:
determining whether a prior datastore-pairing operation request is pending; and
in response to determining that the prior datastore-pairing operation request is pending, delaying determining whether the first datastore is available for pairing until the prior datastore-pairing operation request is complete.

4. The method of claim 3, further comprising:
receiving information associated with the second datastore; and
in response to receiving the information, storing the information in the first datastore.

5. The method of claim 1, wherein the notification is a first notification, the method further comprising:
receiving a second notification indicating that the second datastore has resumed functioning; and
in response to receiving the second notification, sending the information to the second cluster.

6. The method of claim 5, further comprising:
in response to sending the information to the second cluster, deleting the virtual machine from the node in the first cluster.

7. The method of claim 1, further comprising:
in response to generating the entry in the mapping table, disallowing renaming or removing the first datastore.

8. An apparatus comprising:
a communication interface that enables network communications;
a processor; and
a memory storing data and instructions executable by the processor,
wherein the processor is configured to execute the instructions to:
receive, at a cluster controller of a first cluster, a request for pairing a first datastore of the first cluster to a second datastore of a second cluster, wherein each of the first cluster and the second cluster includes a plurality of datastores;
determine whether the first datastore is available for pairing;
in response to determining that the first datastore is available for pairing, generate an entry in a mapping table indicating that the first datastore is paired with the second datastore;
receive a notification indicating that the second datastore is not functioning; and
in response to receiving the notification, instantiate a virtual machine in a node of the first cluster using information stored in the first datastore.

9. The apparatus of claim 8, wherein the entry is a first entry, and wherein the processor is further configured to:
receive an operation request to perform a datastore-pairing operation on the first cluster;
determine whether the datastore-pairing operation is to add or delete a second entry in the mapping table; and
in response to determining that the datastore-pairing operation is to delete the second entry in the mapping table, delete the second entry in the mapping table before determining whether the first datastore is available for pairing.

10. The apparatus of claim 8, wherein the processor is further configured to:
determine whether a prior datastore-pairing operation request is pending; and
in response to determining that the prior datastore-pairing operation request is pending, delay determining whether the first datastore is available for pairing until the prior datastore-pairing operation request is complete.

11. The apparatus of claim 10, wherein the processor is further configured to:
receive information associated with the second datastore; and
in response to receiving the information, store the information in the first datastore.

12. The apparatus of claim 11, wherein the notification is a first notification, and wherein the processor is further configured to:
receive a second notification indicating that the second datastore has resumed functioning; and
in response to receiving the second notification, send the information to the second cluster.

13. The apparatus of claim 12, wherein the processor is further configured to:
in response to sending the information to the second cluster, delete the virtual machine from the node in the first cluster.

14. The apparatus of claim 8, wherein the processor is further configured to:
in response to generating the entry in the mapping table, disallow renaming or removing the first datastore.

15. One or more non-transitory computer-readable storage media encoded with software comprising computer executable instructions which, when executed by a processor of a cluster controller of a first cluster, cause the processor to:
    receive a request for pairing a first datastore of the first cluster to a second datastore of a second cluster, wherein each of the first cluster and the second cluster includes a plurality of datastores;
    determine whether the first datastore is available for pairing;
    in response to determining that the first datastore is available for pairing, generate an entry in a mapping table indicating that the first datastore is paired with the second datastore;
    receive a notification indicating that the second datastore is not functioning; and
    in response to receiving the notification, instantiate a virtual machine in a node of the first cluster using information stored in the first datastore.

16. The one or more non-transitory computer-readable storage media of claim 15, wherein the entry is a first entry, and wherein the instructions further cause the processor to:
    receive an operation request to perform a datastore-pairing operation on the first cluster;
    determine whether the datastore-pairing operation is to add or delete a second entry in the mapping table; and
    in response to determining that the datastore-pairing operation is to delete the second entry in the mapping table, delete the second entry in the mapping table before determining whether the first datastore is available for pairing.

17. The one or more non-transitory computer-readable storage media of claim 15, wherein the instructions further cause the processor to:
    determine whether a prior datastore-pairing operation request is pending; and
    in response to determining that the prior datastore-pairing operation request is pending, delay determining whether the first datastore is available for pairing until the prior datastore-pairing operation request is complete.

18. The one or more non-transitory computer-readable storage media of claim 17, wherein the instructions further cause the processor to:
    receive information associated with the second datastore; and
    in response to receiving the information, store the information in the first datastore.

19. The one or more non-transitory computer-readable storage media of claim 15, wherein the notification is a first notification, and wherein the instructions further cause the processor to:
    receive a second notification indicating that the second datastore has resumed functioning;
    in response to receiving the second notification, send the information to the second cluster; and
    in response to sending the information to the second cluster, delete the virtual machine from the node in the first cluster.

20. The one or more non-transitory computer-readable storage media of claim 15, wherein the instructions further cause the processor to:
    in response to generating the entry in the mapping table, disallow renaming or removing the first datastore.

\* \* \* \* \*